United States Patent
Cookson et al.

(10) Patent No.: US 6,487,365 B2
(45) Date of Patent: *Nov. 26, 2002

(54) DATA STRUCTURE FOR REPRESENTING A PROGRAM CONTAINING COMPONENTS ORGANIZED IN A SERIES OF DATA BLOCKS

(75) Inventors: Christopher J. Cookson, Los Angeles, CA (US); Lewis S. Ostrover, Los Angeles, CA (US); Warren N. Lieberfarb, Los Angeles, CA (US)

(73) Assignee: Time Warner Entertainment Co., L.P., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/047,071

(22) Filed: Jan. 15, 2002

(65) Prior Publication Data

US 2002/0081102 A1 Jun. 27, 2002

Related U.S. Application Data

(63) Continuation of application No. 09/657,125, filed on Sep. 7, 2000, now Pat. No. 6,424,794, which is a continuation of application No. 09/211,588, filed on Dec. 14, 1998, now Pat. No. 6,148,139, which is a continuation of application No. 08/905,475, filed on Aug. 4, 1997, now Pat. No. 6,115,534, which is a continuation of application No. 08/486,611, filed on Jun. 7, 1995, now Pat. No. 5,671,320, which is a continuation of application No. 08/144,791, filed on Oct. 29, 1993, now Pat. No. 5,576,843.

(51) Int. Cl.$^7$ .................. H04N 5/781; G11B 7/007
(52) U.S. Cl. ................ 386/111; 386/125; 348/500; 375/240.01; 711/113; 369/275.1; 369/275.3
(58) Field of Search .................... 386/1, 4, 5, 33, 386/95, 98, 125–126, 111–112; 348/500, 423.1; 369/60.01, 99, 106, 124.01, 124.06, 124.09, 275.1, 275.3; 711/113; 375/240.01; H04N 5/76, 5/92, 5/781, 9/79

(56) References Cited

U.S. PATENT DOCUMENTS

| | | | | | |
|---|---|---|---|---|---|
| 4,679,191 A | * | 7/1987 | Nelson et al. | ................ | 370/84 |
| 4,918,523 A | * | 4/1990 | Simon et al. | ............... | 348/396 |
| 4,985,784 A | * | 1/1991 | Tsuboi et al. | ............... | 358/342 |
| 5,023,707 A | * | 6/1991 | Briggs | ....................... | 358/343 |
| 5,130,815 A | * | 7/1992 | Silverman et al. | .......... | 358/335 |
| 5,130,816 A | * | 7/1992 | Yoshio | ....................... | 358/341 |
| 5,224,089 A | * | 6/1993 | Matsumura et al. | ........ | 369/124 |
| 5,241,526 A | * | 8/1993 | Ishii | ............................. | 369/124 |
| 5,243,587 A | * | 9/1993 | Itoh et al. | ..................... | 369/124 |
| 5,262,964 A | * | 11/1993 | Bousall et al. | .............. | 364/514 |
| 5,289,288 A | * | 2/1994 | Silverman et al. | .......... | 358/335 |
| 5,463,565 A | * | 10/1995 | Cookson et al. | ............ | 348/396 |

* cited by examiner

Primary Examiner—Thai Tran
(74) Attorney, Agent, or Firm—Gottlieb, Rackman & Reisman, P.C.

(57) ABSTRACT

A system for playing a selected one of multiple audio tracks recorded in synchronized fashion with a motion picture on an optical disk. The optical disk has encoded on it a mixing master music and effects ("M&E") track, or a switching master M&E track Individual audio tracks are provided for language-specific versions of the same motion picture, but these tracks have data recorded in them only where there is dialog. In this way, for many a motion picture, all tracks but masters will have data recorded for well less than half of the running time of the motion picture. When a mixing master is used, it is mixed with a language-specific track when the latter has dialog; the mixing master contains no dialog. If a switching master is used, it may contain dialog recorded with the M&E; when a language-specific track has dialog recorded in it, it also contains M&E and the track is played to the exclusion of the switching master.

10 Claims, 11 Drawing Sheets

FIG. 3

| | BITS | | | |
|---|---|---|---|---|
| | MIN | MAX | | COMMENTS |
| 1 | | | LEAD-IN SYNC BITS | |
| 2 | 40 | 40 | AUTHORIZED TERRITORIES | |
| 3 | 1 | 1 | SPECIAL SOFTWARE FLAG | |
| 4 | 0 | UNDET | SPECIAL SOFTWARE W/ENDING SYNC WORD | |
| 5 | 12 | 12 | AUTHORIZED STANDARDS | |
| 6 | 100 | 100 | AVAILABLE AUDIO LANGUAGES, M&E PLUS 99 | N "1"s, MAX 16 |
| 7 | 0 | 48 | TRACK TYPES | N x 3 |
| 8 | 0 | 64 | TRACK CODING | N x 4 |
| 9 | 6 | 6 | NUMBER OF "OTHER" AUDIO TRACKS | M = 0 TO 63 |
| 10 | 0 | 252 | CODING FOR "OTHER" AUDIO TRACKS | M x 4 |
| 11 | 100 | 100 | AVAILABLE DISPLAY LANGUAGES | P "1"s, MAX 99 |
| 12 | 1 | 1 | SPECIAL MIXING/DELETION SOFTWARE FLAG | |
| 13 | 0 | UNDET | SPECIAL MIXING/DELETION SOFTWARE W/ENDING SYNC WORD | |
| 14 | 0 | UNDET | P x M STRINGS EACH ENDING WITH ESC CHARACTER | |
| 15 | 100 | 100 | AVAILABLE SUBTITLE LANGUAGES | R "1"s, MAX 99 |
| 16 | 4 | 4 | MULTIPLE VERSION CODE | |
| 17 | 1 | 1 | SPECIAL VERSION SOFTWARE FLAG | |
| 18 | 0 | UNDET | SPECIAL VERSION SOFTWARE W/ENDING SYNC WORD | |
| 19 | 1 | 1 | VIDEO AVAILABILITY FLAG | |
| 20 | 1 | 1 | BASE ASPECT RATIO | |
| 21 | 1 | 1 | PAN SCAN AVAILABILITY | |
| 22 | 20 | 20 | TOTAL NUMBER OF DATA BLOCKS | |
| 23 | 0 | 20 | NUMBER OF DATA BLOCKS IN VERSION A | |
| 24 | 0 | 20 | NUMBER OF DATA BLOCKS IN VERSION B | |
| 25 | 4 | 4 | ORIGINAL FRAME RATE | |
| 26 | 10 | 10 | BLOCK TIME FACTOR | |
| 27 | 0 | UNDET | TABLE OF CONTENTS FOR FIRST VERSION FOR EACH CHAPTER: 8-BIT CHAPTER NUMBER 20-BIT STARTING BLOCK SERIAL BLOCK NUMBER 20-BIT BLOCK DURATION OF CHAPTER AVAILABLE CHAPTER DISPLAY LANGUAGES (100 BITS) LANGUAGE STRINGS IDENTIFYING CHAPTERS, EACH ENDING WITH ESC CHARACTER | |
| 28 | 0 | UNDET | TABLE OF CONTENTS FOR SECOND VERSION | |
| 29 | 100 | 1200 | ENCRYPTED AUTHORIZATION CODE FOR EACH STANDARD W/ENDING SYNC WORD | |
| 30 | 1 | 1 | DATA BLOCK COMMAND/DATA FLAG | |
| 31 | 1 | 1 | SUPPLEMENTAL SOFTWARE FLAG | |
| 32 | 0 | UNDET | SUPPLEMENTAL SOFTWARE W/ENDING SYNC WORD | |

FIG. 4

| | BITS | | | COMMENTS |
|---|---|---|---|---|
| | MIN | MAX | | |
| 1 | 32 | 32 | SYNC WORD | |
| 2 | 20 | 20 | SERIAL BLOCK NUMBER | |
| 3 | 2 | 2 | VERSION (A,B OR COMMON) | |
| 4 | 0 | 2 | 2-BIT POINTER FLAG | |
| 5 | 0 | 20 | POINTER | |
| 6 | 0 | 1 | VIDEO PRESENT FLAG. | |
| 7 | 0 | UNDET | VIDEO BLOCK W/ENDING SYNC WORD | |
| 8 | 0 | 16 | AUDIO TRACKS PRESENT | X "1"s, MAX=16 |
| 9 | 0 | UNDET | X AUDIO LANGUAGE BLOCKS, EACH ENDING W/ESC CHARACTER | |
| 10 | 0 | 63 | "OTHER" AUDIO TRACKS PRESENT | Y "1"s, MAX=63 |
| 11 | 0 | UNDET | Y "OTHER" AUDIO TRACK BLOCKS, EACH ENDING W/ESC CHARACTER | |
| 12 | 0 | 99 | SUBTITLE UPDATES PRESENT | Z "1"s, MAX=99 |
| 13 | 0 | UNDET | Z SUBTITLE UPDATE BLOCKS, EACH ENDING W/ESC CHARACTER | |
| 14 | 0 | 1 | PAN SCAN UPDATE FLAG | |
| 15 | 0 | 9 | PAN SCAN UPDATE | |
| 16 | 0 | 1 | COMMAND/DATA PRESENT FLAG | |
| 17 | 0 | UNDET | COMMAND/DATA BLOCK ENDING W/ESCAPE CHARACTER | |

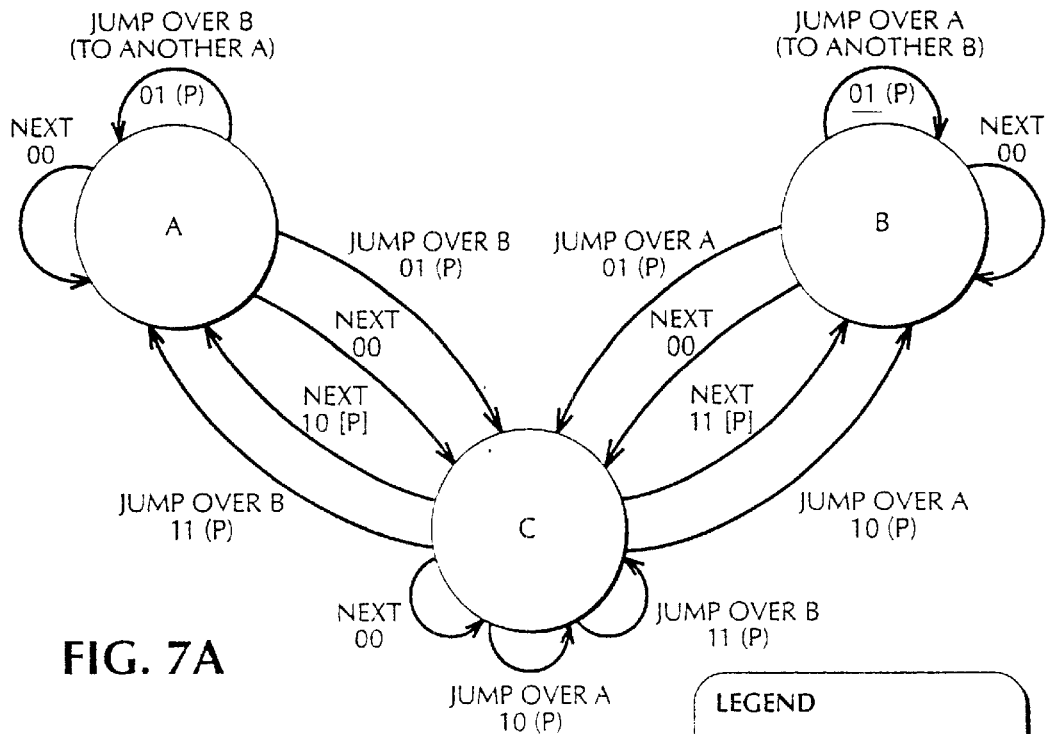

FIG. 7A

CODE
- 00 = <u>Continue</u> to next block
- 01 = <u>Jump</u> to same version or common, one pointer
- 10 = <u>Branch</u> from common:
  Next block is an A, pointer is to a B or a C
  (if version A is being played, continue to next block)
  (if version B is being played, jump to block identified by pointer)
- 11 = <u>Branch</u> from common:
  Next block is a B, pointer is to an A or a C
  (if version A is being played, jump to block identified by pointer)
  (if version B is being played, continue to next block)

LEGEND
10 (P)  
11 (P)  } Use Pointer P

10 [P]  
11 [P]  } Ignore Pointer P

FIG. 7B

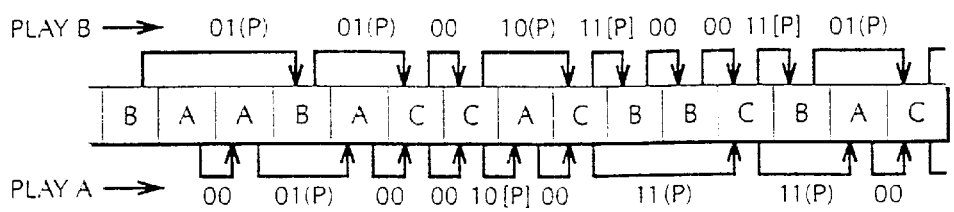

DATA STRUCTURE FOR REPRESENTING A PROGRAM CONTAINING COMPONENTS ORGANIZED IN A SERIES OF DATA BLOCKS

This is a continuation of application Ser. No. 09/657,125 filed Sep. 7, 2000 now U.S. Pat. No. 6,424,794, which is a continuation of application Ser. No. 09/211,588 filed on Dec. 14, 1998 now U.S. Pat. No. 6,148,139, which in turn is a continuation of Ser. No. 08/905,475 filed Aug. 4, 1997 now U.S. Pat. No. 6,115,534, which in turn is a continuation of application Ser. No. 08/486,611 filed on Jun. 7, 1995 now U.S. Pat. No. 5,671,320, which in turn is a continuation of application Ser. No. 08/144,791 filed Oct. 29, 1993 now U.S. Pat. No. 5,576,843.

This invention relates to the generation of audio signals during play of a software (e.g., motion picture) carrier, and more particularly to a technique by which multiple dialog languages may be recorded on separate audio tracks of the same carrier without requiring a full track for each language version.

BACKGROUND OF THE INVENTION

The most widespread medium for distributing motion pictures is the videocassette. The conventional practice is to provide only one language soundtrack on each videocassette. This means that different versions of the same motion picture must be prepared for distribution in different countries. Rather than to dedicate a different version of the same motion picture to each of several different languages, it would be far more advantageous to provide all desired sound tracks, containing different dialog languages, on the same carrier; this would require the production of far fewer versions of the same motion picture. Because of the large storage requirements, however, this has not proven to be practical. In fact, the only practical consumer use of multiple sound tracks on the same carrier is the provision of annotated and non-annotated soundtracks in some laserdisc releases. (It is possible, for example, to store different soundtracks in the digital and analog audio channels of a laserdisc.)

Despite the fact that it has occurred to others in the prior art to provide multiple soundtracks on the same software carrier, certainly the provision of perhaps a dozen different soundtracks, in different dialog languages, all on the same consumer software carrier, is not to be found anywhere. Not only are there no consumer players capable of selecting one from among so many different soundtracks, but software publishers have just not found it practical to store so much audio information on a single carrier. The traditional approach is to publish different versions of the same motion picture for distribution in different territories where different languages are spoken.

Digitally encoded optical disks are in theory far superior for the distribution of motion pictures and other forms of presentation. Especially advantageous is the use of "compressed video," by which it is possible to digitally encode a motion picture on a disk no larger than the present-day audio CD. While much effort has been expended in developing compressed video systems, less work has been devoted to the provision of multiple soundtracks on the same software carrier. The conventional thinking is to pack as much video as possible on any given disk, but still to provide a different soundtrack version carrier for each required dialog language.

It is therefore an object of this invention to provide a system and method for a software publisher to record on a software carrier, such as an optical disk, a motion picture accompanied with multiple soundtracks, in different dialog languages, while at the same time eliminating redundant information so that the storage is as efficient as possible.

SUMMARY OF THE INVENTION

A key to the understanding of the present invention is that there are sections of many video programs in which no dialog occurs. In the absence of dialog, there is no reason to provide a language-specific track. During any "no dialog" sequence, all that are available, if even that, are music and effects. Thus a music and effects (M&E) track is really all that is necessary—for all language versions—during much of the total running time of a motion picture. In fact, an M&E track is all that is required in the usual case for far more than half the running time. Obviously, a Shakespearean movie will have more dialog, and hence more language-specific dialog, than an action-adventure movie. Nevertheless, most present-day releases have far more non-dialog M&E than they do the spoken word Before summarizing the invention, it is to be appreciated that the present invention contemplates data-efficient storage and recovery of various audio versions, and not just different language movie soundtracks. For example. multiple soundtracks could include teaching and testing versions of the same material, and there could perhaps be teaching and testing versions for multiple levels of expertise. The multiple soundtracks that would be provided in such a case might even have some dialog in common, not only M&E. Thus, it is to be understood that the object of.the invention is to provide a plurality of audio tracks synchronized with a motion picture, and not necessarily audio tracks which differ only in terms of language. It is also to be understood that the invention is not limited to a particular medium, and it is applicable to tape carriers and all digital storage media, not just the optical disks of the illustrative embodiment of the invention. Nor is the invention limited only to the distribution of motion pictures. For example, in an extreme case, the invention is applicable to the distribution of a library of still pictures, in which case there is no "motion" at all. The term "audio tracks" thus embraces much more than audio tracks with different dialog languages, the term "software publisher" thus embraces much more than a motion picture company, and the term "carrier" embraces much more than a digitally encoded optical disk.

The illustrative embodiment of the invention is an optical disk which includes multiple audio tracks synchronized with a motion picture track. At least one of the audio tracks is a mixing master or a switching master. A mixing master is a track which includes M&E, but for the most part no dialog. A switching master is a track which includes M&E, together with dialog in a particular language. Other tracks on the disks are specific to respective languages and include material that is language specific. Where no language-specific material is required for a particular audio track, nothing is recorded so that there is no wasted "real estate," as will be described below. Consider the case of a mixing master M&E track, and three language-specific audio tracks in English, Spanish and French. For a two-hour movie, the M&E track might have recorded close to two hours of audio. (Where there is no sound at all, there is no need to store any data, once again in order to avoid wasting any storage capacity.) The three language-specific tracks have dialog recorded in them, but no music and no effects—and each of the three tracks his data recorded in it only where it is necessary for dialog. The user selects one of the three tracks, the French track, for example, if he wants to hear the French version of the movie. The mixing master audio track and the French audio track are the only ones which are read by the player, and he digital information recorded in the two tracks is mixed, so that the net result is a conventional soundtrack, in French. To play the Spanish version of the same movie, the user would simply select the Spanish-soundtrack instead of the French.

A switching master, on the other hand, would typically include dialog. Consider a motion picture which is originally shot with the actors speaking English. The switching master audio track would include the original motion picture soundtrack. To play the English version of the release, the switching master audio track would be played by itself from beginning to end. But suppose that it is desired to play the French version of the motion picture. In this case, the French audio track would include not only French dialog, but French dialog together with music and effects. All that is necessary to derive the French version of the motion picture is to play the switching master audio track most of the time, but to switch from it to the French audio track—and to play the French audio track alone—where there is French dialog. The major difference between using mixing and switching masters is that the former is mixed with one of the language-specific tracks so that M&E can be (although does not necessarily have to be) recorded only on the master track, while in a switching system only one track is played at any given time so that M&E has to be recorded on the language-specific tracks. It is also possible to provide both schemes on the same disk, i.e., to provide both kinds of master tracks, with some of the language-specific tracks being used with the mixing master, and some being used with the switching master.

The disk includes within its lead-in section a series of codes which identify whether each audio track on the disk is a mixing master, a switching master, a track to be mixed with a mixing master, or a track to be switched with a switching master. There are a maximum of 16 audio tracks which may be provided. However, there are many more languages than this number. It is necessary to identify which languages are available on the disk so that the user can control his player to generate a soundtrack in the desired language. For this reason, the lead-in section of the disk identifies which languages are available on the disk. In the illustrative embodiment of the invention, the first audio track is an M&E track, a mixing master or a switching master. If there are a total of N audio tracks, where N is 16 or less, then there may be N-1 language-specific audio tracks. (There would be N-2 language-specific tracks if both mixing and switching masters are provided.) If the first track is a mixing master, then there can be at most N-1 language-specific versions since dialog is available only starting with the second track. (Theoretically, if the first track is a switching master and it contains dialog in the original language, then this track can be played alone from beginning to end and there are N language versions available.) If a player determines from an analysis of the lead-in section of the disk that the first audio track is a mixing master and the fourth audio track contains dialog in French, and it this fourth track that is to be mixed with the mixing master, then all that is required for generation of a French soundtrack is to mix the first and fourth soundtracks. This is not to say that there will always be data in these tracks. On the contrary, the underlying assumption of the invention is that the French-specific audio track will, more often than not, contain no data.

Information recorded on the software carrier is recorded in separately identifiable blocks. This is true for both video and all of the synchronized audio. Each block contains indicia of which audio tracks in the block represent a signal. Thus, a particular block may contain switching master information, as well as information in a language-specific track which is to be switched with the switching master. When the player determines at the start of the reading of a block that the block contains data in a language-specific track, it switches from play of the switching master to play of the language-specific track. All it takes is a single bit for each of the up to N tracks at the beginning of a block to allow the player to determine whether respective language-specific information is in the block being processed.

Other features of the invention will be described below. For example, a citizen of Spain, who purchases a player and optical disks in Spain, can be assumed to want to hear Spanish versions of a motion picture. Therefore, a player sold in Spain should "default" to play of a Spanish audio track if one is available on the disk. Only if the default language is not available, or the user actually wants to hear dialog in a different language, should she be required to choose from among the available languages. How the data is stored on software carriers, and how it is accessed and played, will be discussed at length below.

The invention is disclosed in the context of an overall system which offers numerous advantageous features. The entire system is described although the ,appended claims are directed to specific features. The overall list of features which are of particular interest in the description below include:

Video standard and territorial lock out.

Play in multiple aspect ratios.

Play of multiple versions, e.g., PG-rated and R-rated, of the same motion picture from the same disk, with selective automatic parental disablement of R-rated play.

Encrypted authorization codes that prevent unauthorized publishers from producing playable disks.

Provision of multiple-language audio tracks and multiple-language subtitle tracks on a single disk, with the user specifying the language of choice.

Provision of multiple "other" audio tracks, e.g., each containing some component of orchestral music, with the user choosing the desired mix.

Variable rate encoding of data blocks, and efficient use of bit capacity with track switching and/or mixing, to allow all of the above capabilities on a single carrier.

Further objects, features and advantages of the invention will become apparent upon consideration of the following detailed description in conjunction with the drawing, in which:

FIG. 3 is a chart which lists the fields in the lead-in portion of the digital data track of an optical disk that can be played in the system of FIG. 2;

FIG. 4 is a similar chart which lists the fields in each of the data blocks which follow the lead-in track section of FIG. 3;

Figure 8:
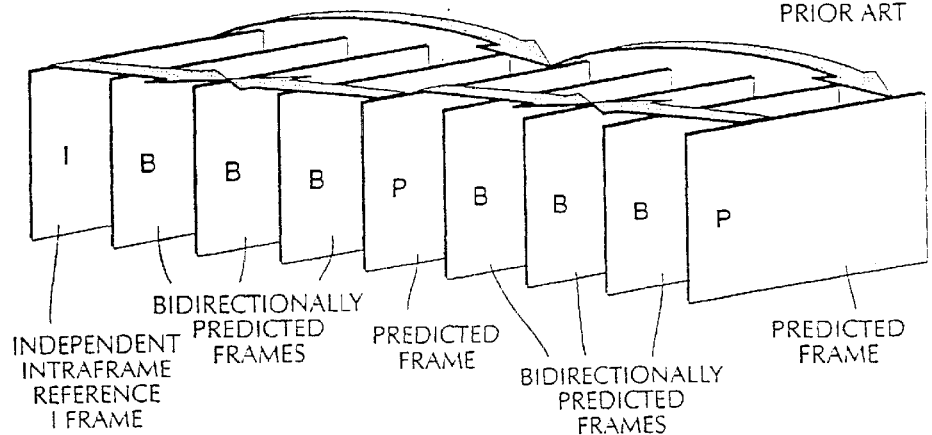
Figure 9:
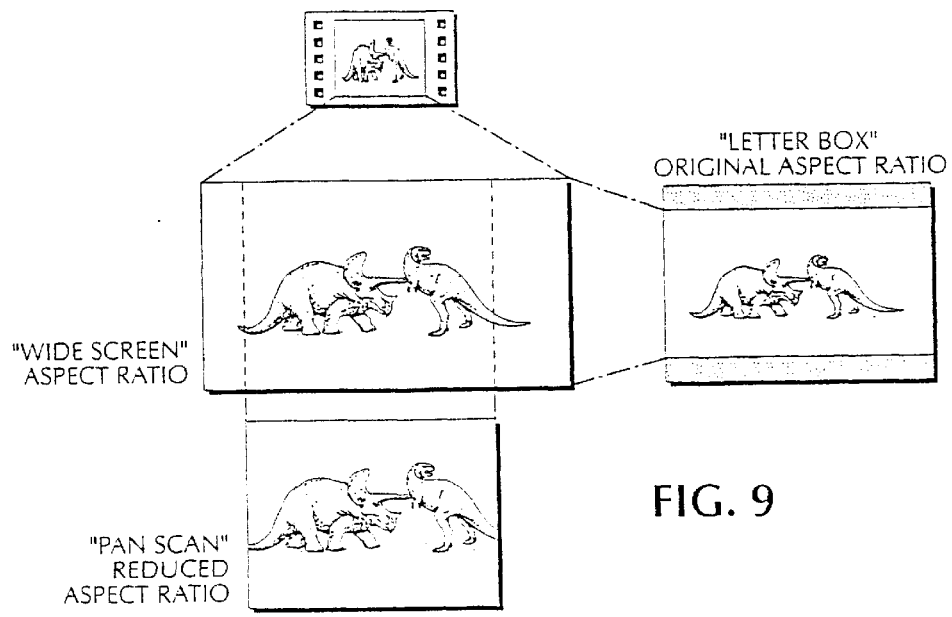
Figure 2:
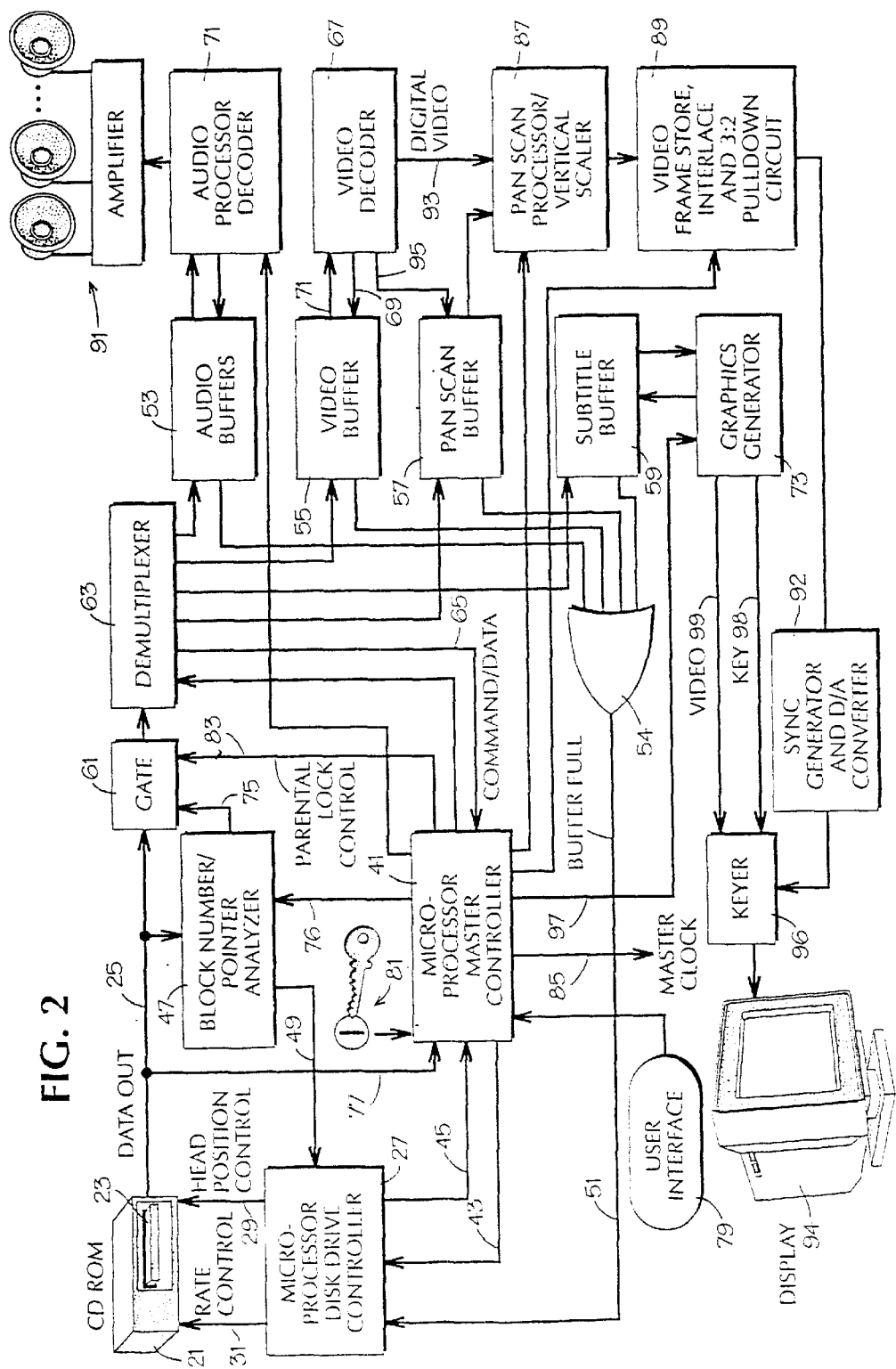
FIG. 2 depicts the illustrative embodiment of the invention.
Figure 6:
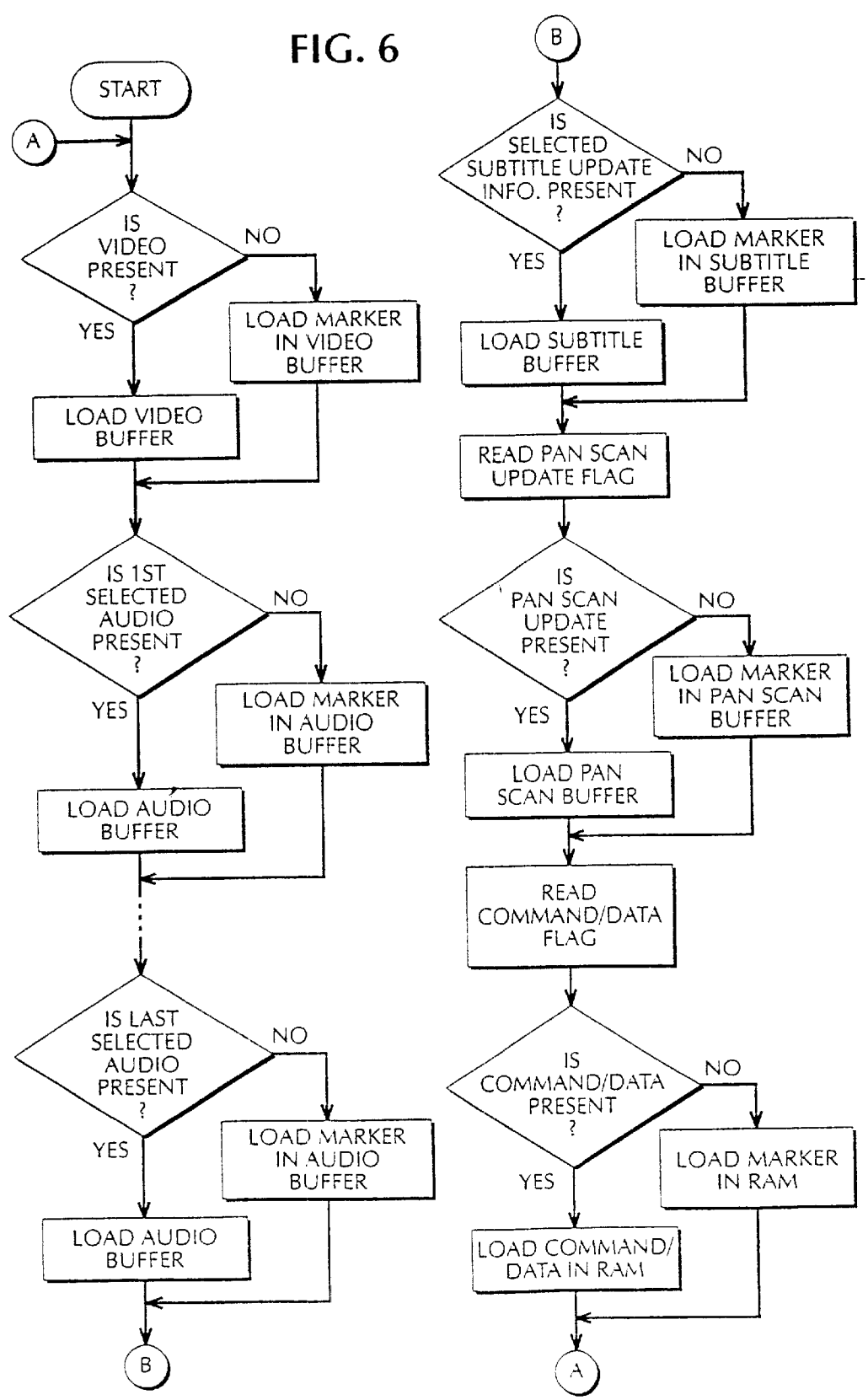

FIGS. 5A–5E comprise a flowchart that illustrates the processing by the system of FIG. 2 of the data contained in the lead-in track section of an optical disk being played;

FIG. 6 is a flowchart that illustrates the processing of the data blocks, in the format depicted in FIG. 4, that follow the lead-in section of the track;

FIG. 7A is a state diagram and legend that characterize the manner in which the player of the invention reads only those data blocks on a disk track that are required for the play of a selected version of a motion picture or other video presentation, and FIG. 7B depicts the way in which one of two alternate versions can be played by following the rules illustrated by the state diagram of FIG. 7A;

FIG. 8 depicts symbolically a prior art technique used in compressing the digital representation of a video signal; and FIG. 9 illustrates the relationships among three different image aspect ratios.

THE PRIOR ART

Figure 1:
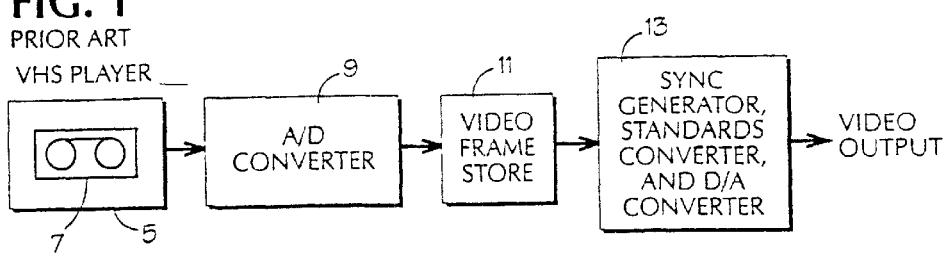
FIG. 1 depicts a prior art system and typifies the lack of flexibility in, and the poor performance of, presently available media players.

The limitations of the prior art are exemplified by the system of FIG. 1. Such a system is presently available for playing a single source of program material, usually a VHS videocassette, to generate a video signal conforming to a selected one of multiple standards. A system of this type is referred to as a multi-standard VCR, although stand-alone components are shown in the drawing. Typically, a VHS tape 7 has recorded on it an NTSC (analog) video signal, and the tape is played in a VHS player 5. The analog signal is converted to digital form in A/D converter 9, and the digital representations of successive frames are written into video frame store 11. Circuit 13 then deletes excess frames, or estimates and adds additional frames, necessary to conform to the selected standard, e.g., PAL. To convert from one standard to another, it is generally necessary to change the number of horizontal lines in a field or frame (image scaling). This is usually accomplished by dropping some lines, and/or repeating some or averaging successive lines to derive a new line to be inserted between them. The main function of circuit 13, of course, is to convert a digital frame representation to analog form as the video output Systems of the type shown in FIG. 1 generally degrade the video output Conventional videocassettes deliver reduced quality video when they support more than one video standard. One reason is that there is a double conversion from analog to digital, and then back again. Another is that the image scaling is usually performed in a crude manner (deleting lines, repeating lines and averaging lines). There are known ways, however, to perform image scaling in the digital domain without degrading the picture. While not generally used, the technique is in the prior art and will therefore be described briefly as it is also used in the illustrative embodiment of the invention.

To give a concrete example, the PAL standard has 625 lines per frame, while the NTSC standard has 525 lines per frame. Because no part of the image is formed during the vertical retrace, not all of the horizontal line scans in either system are usable for representing image information. In the PAL standard there are nominally 576 lines per frame with image information, and in an NTSC frame there are nominally 483 lines with image information.

To convert from one standard to another, successive fields are first de-interlaced. Then 576 lines are converted to 483, or vice versa, and re-interlaced. How this is done is easy to visualize conceptually. Consider, for example, a very thin vertical slice through a PAL frame. The slice is broken down into its three color components. Image scaling for converting from PAL to NTSC, from a conceptual standpoint, is nothing more than drawing a curve based on 576 PAL pieces of color data and then dividing the curve into 483 parts to derive a piece of data for each horizontal line of the desired NTSC signal. In actuality, this is accomplished by a process of interpolation, and it is done digitally. (Image scaling, in general, may also involve a change in the aspect ratio, for example, in going from HDTV to NTSC, and may require clipping off information at both ends of every horizontal line.)

While prior art systems thus do provide for standards conversion, that is about the extent of their flexibility. The system of FIG. 2, on the other hand, offers unprecedented flexibility in ways not even contemplated in the prior art.

The Illustrative System of the Invention

The system of FIG. 2 includes a disk drive 21 for playing an optical disk 23. Digital data stored on the disk appears on the DATA OUT conductor 25. The disk drive operation is governed by microprocessor disk drive controller 27. The read head is positioned by commands issued over HEAD POSITION CONTROL lead 29, and the speed of the disk rotation is governed by commands issued over RATE CONTROL conductor 31. Optical disks are usually driven at either constant linear velocity or constant angular velocity. (Another possibility involves the use of a discrete number of constant angular velocities.) Disks of the invention may be driven at constant linear velocity so that the linear length of track taken by each bit is the same whether a bit is recorded in an inner or outer portion of the track. This allows for the storage of the most data. A constant linear velocity requires that the rate of rotation of the disk decrease when outer tracks are being read. This type of optical disk control is conventional. For example, the CD audio standard also requires disks which are rotated at a constant linear rate.

Microprocessor 41 is the master controller of the system. As such, it issues commands to the disk drive controller over conductor 43 and it determines the status of the disk drive controller over conductor 45. The disk drive controller is provided with two other inputs. Block number/pointer analyzer 47 issues commands to the disk drive controller over conductor 49, and BUFFER FULL conductor 51 extends a control signal from OR gate 54 to the disk drive controller. These two inputs will be described below. (In general, although reference is made to individual conductors, it is to be understood that in context some of these conductors are in reality cables for extending bits in parallel. For example, while the output of OR gate 54 can be extended to the disk drive controller over a single conductor 51, block number/pointer analyzer 47 could be connected to the disk drive controller over a cable 49 so that multi-bit data can be sent in parallel rather than serially.)

An important feature of the system of FIG. 2 is that bit information is stored on the disk at a rate which varies according to the complexity of the encoded material. By this is meant not that the number of bits per second which actually appear on the DATA OUT conductor 25 varies, but rather that the number of bits which are used per second varies. Video information is stored in compressed digital form. FIG. 8 shows the manner in which video frames are coded according to the MPEG1 and MPEG2 standards. An independent I-frame is coded in its entirety. Predicted or P-frames are frames which are predicted based upon preceding independent frames, and the digital information that is actually required for a P frame simply represents the difference between the actual frame and its prediction. Bidirectionally predicted B-frames are frames which are predicted from I and/or P frames, with the information required for such a frame once again representing the difference between the actual and predicted forms. (As can be appreciated, fast forward and fast reverse functions, if desired, are best implemented using I-frames.) The number of bits required to represent any frame depends not only on its type, but also on the actual visual information which is to be represented. Obviously, it requires far fewer bits to represent a blue sky than it does to represent a field of flowers. The MPEG standards are designed to allow picture frames to be encoded with a minimal number of bits. Frame information is required at a constant rate. For example, if a motion picture film is represented in digital form on the disk, 24 frames will be represented for each second of play. The number of bits required for a frame differs radically from frame to frame. Since frames are processed at a constant rate, it is apparent that the number of bits which are processed (used) per second can vary from very low values to very high values. Thus when bits are actually read from the disk, while they may be read from the disk at a constant rate, they are not necessarily processed at a constant rate.

Similar considerations apply to any audio stored on the disk. Any data block may contain the bit information required for a variable number of image frames. Any data block may similarly contain the bit information required for a variable time duration of a variable number of even numerous audio tracks. (There is just one physical track. The reference to multiple audio tracks is to different series of time-division slices containing respective audio materials.) The audio tracks contain digital information, which may also be in compressed form. This means that if there is information stored in any data block for a particular audio track, those bits do not necessarily represent the same time duration. It might be thought that the duration of the sound recorded for any audio track corresponding to any picture frames represented in a block would be the duration of the picture frames. However, that is not necessarily true. This means that audio information may be read before it is actually needed, with the reading of more audio information pausing when a sufficient amount has already accumulated or with audio not being included in some data blocks to compensate for the preceding over-supply. This leads to the concept of buffering, the function of audio buffers 53, video buffer 55, pan scan buffer 57, subtitle buffer 59, and OR gate 54 which generates the BUFFER FULL signal.

As each data block is read from the disk, it passes through gate 61, provided the gate is open, and the bit fields are distributed by demultiplexer 63 to the various buffers and, over the COMMAND/DATA line 65, to master controller 41. Each data block in the illustrative embodiment of the invention contains video bit information corresponding to a variable number of picture frames. As discussed above, there may be a large number of bits, or a small number, or even no bits (for example, if the particular disk being played does not represent any video). Successive groups of video data are stored in video buffer 55 separated by markers. Video decoder 67 issues a command over conductor 69 when it wants to be furnished with a new batch of data over conductor 71. Commands are issued at a steady rate, although the number of bits furnished in reply vary in accordance with the number of bits required for the particular frames being processed. The rate at which bits are read from the disk drive is high enough to accommodate frames which require maximal information, but most frames do not. This means that the rate at which data blocks are actually read is higher than the rate at which they are used. This does not mean, however, that a well-designed system should delay reading of a block of data until the data is actually required for processing. For one thing, when data is actually required, the read head may not be positioned at the start of the desired data block. It is for this reason that buffering is provided. The video buffer 55 contains the bit information for a number of successive frames (the actual number depending upon the rate at which bits are read, the rate at which frames are processed, etc., as is known in the art), and video data block information is read out of the video buffer at a constant frame rate determined by video decoder 67. Video data is delivered to the buffer only until the buffer is full. Once the buffer is full, no more information should be delivered because it cannot be stored. When the video buffer is full, a signal on conductor 69 causes the output of OR gate 54 to go high to inform disk drive controller 27 that one of the buffers is full.

Similar remarks apply to the three other types of buffers. (There is a single subtitle buffer 59, a single pan scan buffer 57, and numerous audio buffers 53, the purpose of all of which will be described below.) When any of these buffers is full, its corresponding output causes OR gate 54 to control the BUFFER FULL conductor to go high and to so inform the disk drive controller that one of the buffers is full. Audio buffers 53 and subtitle buffer 59 operate in a manner comparable to that described for video buffer 55. Audio processor decoder 71 issues a command to the audio buffers when it requires audio track data, at which time the audio buffers furnish such data. Similarly, graphics generator 73 retrieves data from subtitle buffer 59, and pan scan processor/vertical scaler 87 receives data from pan scan buffer 57 as will be described below.

When any one of the four buffers is full (which includes any one of the individual buffers within the block 53), the disk drive controller 27 causes the disk drive to stop reading data. Data is not read again until all of the buffers can accept it, i.e., until no buffer is full and conductor 51 goes low. (Conversely, if the buffers are being depleted of data too rapidly, an adjustment in the RATE CONTROL signal on conductor 31 increases the disk speed and thus the rate at which the buffers are filled.)

This discussion of buffering arose from a consideration of the BUFFER FULL input 51 to the disk drive controller 27. The other input which remains to be described is that represented by cable 49. As will be described below, every data block has a serial block number as well as pointer information at its beginning. Circuit 47 reads the serial block number and analyzes the pointer information. The pointer, a serial block number, points to the next data block which should be read. This information is furnished to the disk drive controller over cable 49. It is in this way that the disk drive controller can control positioning of the read head of the disk drive so that the desired data block can be accessed. Many times the wrong block will be read—this is to be expected in the case of a jump to a new block, as is the case, for example, when a jump is made from one track to another when playing a CD audio disk. If the disk drive reads a data block whose serial block number is too high or too low, this is determined by block number/pointer analyzer 47 which then issues a new command over cable 49 to the disk drive controller to cause it to read another block with a lower or higher serial block number respectively. During the time that the read head is positioning itself to read a new block, the data which is read is not actually used. Gate 61 remains closed so that the information is not delivered to the demultiplexer 63 for distribution to the four buffers and to the master controller 41 over the COMMAND/DATA lead. It is only when the correct data block is reached, as determined by circuit 47 analyzing the serial block number at the start of the block, that conductor 75 is pulsed high to open gate 61.

The remainder of the block is then delivered to the demultiplexer. The data bits read from the disk are also delivered to the microprocessor master controller 41 over conductor 77. Each data block contains not only bit information which must be distributed to the various buffers, but also control information, e.g., bits that identify the kind of data actually to be found in the block. The identification bits (flags and the like, as will be described below) are furnished to the master controller so that it is in control of the system at all times. The identification bits are used by the demultiplexer to control data distribution to the various buffers. (The master controller issues commands over conductor 76 to the block number/pointer analyzer 47 which exercise not only general control over this element, but also specific control by causing element 47 to turn off the enabling signal on conductor 75 as is appropriate to prevent full data blocks from entering the demultiplexer if they are not required for subsequent processing.)

The master controller is at the heart of the system and in fact carries out the bulk of the processing to be described below. The user of the player communicates with the master controller via an interface 79, typically a keyboard. The user also is provided with a key and lock mechanism, shown symbolically by the numeral 81, which is referred to herein as the "parental lock" option. If the lock is turned on, then R-rated motion pictures will not play. The manner in which this is controlled by bits actually represented on the disk will be described below. If the lock is on, and only an R-rated picture is on the disk, a disabling signal on PARENTAL LOCK CONTROL conductor 83 closes gate 61. No data bits are transmitted through the gate and the disk cannot be played. As will become apparent below, if the disk also has on it a version of the film which is not R-rated, it will play if it is selected by the viewer. Although the parental lock feature is shown as requiring the use of an actual key and lock, it is to be understood that the feature can be implemented by requiring keyboard entries known only to a child's parents. The manner of informing the master controller that R-rated versions of a motion picture should not be viewed is not restricted to any one form. Just as physical keys and coded keys are alternatively used to control access to a computer, so they can be in the system of FIG. 2. What is important is the way in which two different versions can be represented on the same disk (without requiring the full version of each), and how the system determines whether a selected version may be played in the first place. This will be described below.

Master controller 41 includes several other outputs which have not been described thus far. Conductor 85 represents a MASTER CLOCK bus which is extended to all of the sub-systems shown in FIG. 2. In any digital system, a master clock signal is required to control the proper phasing of the various circuits. The six other outputs of the master controller are extended to demultiplexer 63, audio processor decoder 71, pan scan processor/vertical scaler 87, video frame store. interlace and 3:2 pulldown circuit 89, graphics generator 73, and sync generator and DVA converter 92. These are control leads for governing the operations of the individual circuit blocks.

Audio processor decoder 71 processes the data in buffers 53 and derives individual audio analog signals which are extended to an amplifier/speaker system shown symbolically by the numeral 91. Video decoder 67 derives a DIGITAL VIDEO signal on conductor 93 from the compressed video data which is read from buffer 55. The digital video is fed to pan scan processor/vertical scaler 87 frame by frame. The particular video coding/decoding that is employed is not a feature of the present invention. A preferred standard would be one along the lines of MPEG1 and MPEG2, but these are only illustrative. The same is true of the audio track coding. The present invention is not limited to particular coding methods.

The operations of circuits 57 and 87 can be best understood by first considering the symbolic drawing of FIG. 9. The digital information which is stored on the optical disk in the preferred embodiment of the invention characterizes frames having a "master" aspect ratio of 16:9, the so-called "wide screen" image. The master aspect ratio is shown on the upper left in FIG. 9. If the ultimate analog signal to be displayed on the user's television receiver requires this aspect ratio, and the number of horizontal scan lines with picture information (as opposed to horizontal scan lines which occur during vertical retrace) corresponds with the number of horizontal lines represented by the video bit information stored on the disk, then the generation of the video analog signal is straightforward. But if the television receiver of the user accommodates a TV signal having a 4:3 aspect ratio, and the master aspect ratio on the disk is 16:9 rather than 4:3, then there are two choices. One is to display the original picture in "letter box" form. As depicted on the right side of FIG. 9, what is done in this case is to vertically compress uniformly a master image so that its horizontal dimension fits into the confines of the television receiver. This results in the vertical dimension being shortened at the same time so that it fills less than the full height of the TV display area. What this means is that the horizontal line scans at the top and bottom of each overall frame must be blanked, with dark bands forming in their place—but the original aspect ratio is preserved. The other option is for a "pan scan" reduced aspect ratio. What this involves is superimposing a box having a 4:3 aspect ratio on the original wide screen image. As a result, the left side of the picture, the right side, or both sides, are clipped off. (In all cases, even if a wide screen image corresponding to a 16:9 master aspect ratio is to be shown, it may be necessary to form a number of horizontal line scans which is different from the number of horizontal lines represented on the disk. The number of horizontal lines is a function of the video signal standard to which the video output must conform. Changing the number of lines is a process known as vertical scaling, as described above.)

With respect to pan scan processing, it will be apparent from FIG. 9 that in order to identify that portion of a 16:9 master aspect ratio picture which should be used to form a pan scan reduced aspect ratio picture, all that is required is to specify the starting point along each horizontal line scan of the information that should be used. Specifying a single number (e.g., column 200 out of a total of 960 columns) suffices for this purpose. The issue, however, is whether the same column is always used. In some cases the player may be told that if a 4:3 aspect ratio is desired, it should always be taken from the middle of the wide screen image. In other cases, a variable column starting point may be desired, in which case a data block actually contains information which represents the starting column number which should be used from that point until another change is effected.

As will become apparent below, the video information in each data block includes a flag which represents whether the pan scan column information should be updated. If there is such a flag, video decoder 67 issues a command over conductor 95 to pan scan buffer 57. At this time the buffer accepts a pan scan. update from demultiplexer 63. That update remains in the buffer, for use by pan scan processor/vertical scaler 87 with the succeeding frames, until another change takes place.

It is in pan scan processor/vertical scaler 87 that the number of horizontal lines is adjusted and the aspect ratio is changed. The digital video is furnished by video decoder 67 and the pan scan information, if it is required, is provided by buffer 57. The output of circuit 87 consists of uncompressed digital video, in the desired aspect ratio and represented by the number of horizontal lines required for the selected television standard.

Once video frame information is stored digitally in frame store 89, it can be broken up into interlaced fields if the selected standard requires it. Also, 3:2 pulldown is the technique used to convert 24-frames-per-second motion pictures to 60-fields-per-second video (the nominal values of 24 and 60 are in reality 23.97 and 59.94); to convert data representative of a motion picture to an NTSC format, frame information (data blocks) must be read at the rate of 24 per second. (As is standard in the art, such a transformation applies frame 1 of the source material to fields 1, 2 and 3 of the video signal, frame 2 of the source material to fields 4 and 5 of the video signal, frame 3 of the source material to fields 6, 7 and 8, etc., thus yielding 60 fields for 24 original frames.) On the other hand, conversion to the PAL standard is relatively simple, and 3:2 pulldown is not required. The PAL standard requires 50 fields per second. Frames are processed at the rate of 25 per second, and every frame is used to form two fields. (Because motion picture films are shot at the rate of 24 frames per second yet processed at the rate of 25 per second when converting to PAL, everything which occurs on the TV screen takes place 4% faster in Europe than it does in the United States.) Whether the frames are processed at the rate of 25 per second or 24 per second is controlled by changing the frequency of the MASTER CLOCK signal on bus 85.

The output of block 89 is digital, and is extended to sync generator and D/A converter 92. It is in this element that appropriate sync pulses are inserted into the fields, and the digital information is converted to analog. Any subtitles that are required are contained in buffer 59. Under control of microprocessor 41, commands are issued over control lead 97 to graphics generator 73. This conventional circuit retrieves coded character information from the subtitle buffer and generates a VIDEO signal on conductor 99 which depicts the subtitles. The KEY signal is generated on conductor 98, and the two signals are extended to a conventional keyer circuit 96. This device merges the subtitles with the video image (utilizing hard or linear keying at the manufacturer's option, as is known in the art) and extends the composite video signal to a conventional TV display device 94.

Lead-In Track Fields

Before proceeding with a description of the detailed processing, it will be helpful to consider the information which is stored in the lead-in portion of the disk track. This information is stored in individual fields as depicted in FIG. 3, and it is this information which controls subsequent processing of the data read from the disk. The format of a data block is shown in FIG. 4, but for an understanding of how the data in this block is used, it is necessary to appreciate the set-up information which is read first Referring to FIG. 3, at the start of the track there are a number of lead-in sync bits. Although for all other entries minimum and maximum numbers of bits are depicted in the appropriate columns, no such numbers are provided for the lead-in sync bits. The number of sync bits required at the beginning of the track depends on the hardware employed. Given the particular hardware and range of disk speeds involved, a sufficient number of sync bits are provided at the start of the track to allow the circuits involved with reading the disk, including disk drive controller 27 and block number/pointer analyzer 47, to synchronize themselves to the bit stream on DATA OUT conductor 25. Bit synchronization is a technique well known in digital systems.

The second field consists of 40 bits representing authorized territories. There are several ways in which software publishers can lock out play of their software. The most important involve controlling whether R-rated motion pictures can be played (the parental lock out option), and whether the final analog output video signal can assume the standard selected by the user. It is in this way, for example, that a software publisher might allow a motion picture to be played on an NTSC receiver but not a PAL receiver. But as long as the player is provided with this kind of lock out control, it can be extended to territories. All players used with the disks of the invention conform to the same set of specifications. One feature of the design is that each player is provided with a representation of the territory or territories for which it has been intended for sale. For example, the territory or territories can be represented by the settings of a DIP switch, a code stored in a microprocessor ROM (e.g., in master controller 41) or the like. It is assumed that there are a total of 40 possible territories. Each disk has a 40-bit field in its lead-in section, each bit of which is associated with one of the 40 territories. A 1 in any bit position is an indication that the disk is authorized for play in the respective territory, and a 0 is an indication that it is not A player whose code indicates that it is for sale in China, for example, will not play a disk if there is a 0 in the 40-bit territory field at the position associated with China.

As an example of the use of such a feature, consider a player intended for sale in a particular country. A software publisher might put out a motion picture film which for contractual reasons is not to be released in that country. It is for this reason that a 0 would be stored in the bit position associated with that country in the authorized territories field of the lead-in section of the track. Upon sensing this bit, master controller 41 would cause circuit 47 to generate an inhibit signal on conductor 75 which would permanently cause gate 61 to block all data from passing through it.

The third field is a single bit, a flag which indicates whether there is any information in the following field. This information is termed herein "special software." The player of FIG. 2 ordinarily executes the same software code, typically contained in read-only memory. It is this code which will be described in connection with the flowcharts of the drawing. However, since the player is microprocessor controlled, there is no reason why it cannot be used for some even totally unrelated purpose, and this can be enabled simply by loading software from the disk. If the special software flag is a 1, then master controller 41 reads on conductor 77 the software which immediate follows in field 4. Thus depending on whether the special software flag is a 0 or a 1, the fourth field is either empty or contains software of undetermined length. At the end of the software there is a sync word which is unique in the sense that this word is not allowed to occur anywhere in the overall data stream. When the sync word pattern appears, it is an indication that the preceding data field has come to an end, and a new field follows. (In the event data having the sync word pattern would otherwise appear in the data stream and be misinterpreted as a sync word, it can be avoided using known techniques. For example, if the sync word consists of 32 bits of a predetermined pattern, and some overall data sequence includes this pattern within it, then after 31 bits of the data pattern are recorded, an extra bit, having a value opposite that of the last bit in the sync word pattern, may be inserted in the bit stream. When the player sees this bit, it discards it and treats the following bit as a data bit instead of the last bit of the sync word.)

An example of special software might be software for controlling video games. While the player is provided with an operating system designed for the play of motion pictures and multi-track audios, it is certainly feasible for the player to perform additional and/or different functions involved in the play of video games. This is especially true if the user interface is detachable and joysticks and the like may be connected in place of a keyboard to accommodate game-playing peripheral equipment. The system can be converted to a video game player simply by storing the necessary software as it is read from the disk. While in the flowcharts to be described below the special software is shown as being self-contained and not involving the standard processing steps, the special software can certainly call operating system subroutines for execution in order to take advantage of the built-in code.

The fifth field consists of 12 bit positions, each corresponding to a different standard. Standards include 1250-line European HDTV, 1125-line Japanese HDTV, 1050-line proposed American HDTV (as well as 1080-line and 787-line proposed standards), 625-line PAL, 525-line NTSC, 625-line SECAM, 360-line "letter box", etc. It is even possible to accommodate future standards, although to form an appropriate video signal in such a case different software would be required. However, that simply entails providing software on a disk to supplement the built-in operating system.

As a single example, if the first bit position of the 12-bit field corresponds to the NTSC standard, and if the user selects an NTSC standard for play on his TV receiver, or if that is his default setting (as will be discussed below), then an NTSC signal will be generated only if the first bit in the authorized standards field is a 1.

Field 6 always contains 100 bits. These bits represent respective audio languages—dialog—for a motion picture. It is rare that so many foreign-language versions of the same motion picture will be prepared, and it is not contemplated that so many versions will actually be included on a disk. In fact, there are a maximum of 16 audio tracks which can contain dialog in different languages. Each of the 100 bits, except the first, represents one of 99 languages. If there is a 1 in the corresponding bit position, it is an indication that there is an audio track with dialog in the corresponding language.

The first of the 100 bit positions does not really correspond with a language. Instead, a 1 in the first bit position means that there is a music and effects ("M&E") track. (By "effects" is meant such things as the sound associated with thunder, gunshots and the like.) As indicated in the Comments field on FIG. 3, there are N "1"s in field 6 of the lead-in section of the overall track, where N has a maximum value of 16 (one M&E track and up to 15 dialog tracks, or up to 16 dialog tracks without M&E). As a single example, suppose that the third bit position corresponds with, French, the fifth corresponds with Greek, and the 100-bit field is 10101000 . . . 0. This means that there is an M&E track, as well as French and Greek dialog tracks. It does not mean that every single data block on the disk includes bit information which represents M&E, and French and Greek dialog. What it does mean is that any data block has at most three audio tracks with M&E and/or dialog. It also means that any data block which has such audio track information contains the information in the order M&E, French, Greek. Just how the system determines which specific data blocks contain audio information for those languages represented in the 100-bit field will be described below in connection with the fields contained in a data block.

It should be understood that the language audio tracks do not necessarily include just dialog. As will be described shortly, it is possible to mix an M&E track with a French dialog track, with the result being a complete audio track suitable for play in France. But it is certainly possible that a particular audio track will include pre-mixed M&E and original dialog. For example, if bit position 10 of the 100-bit field represents English dialog and there is a 1 stored there, it means that there is an English language version of audio on the disk. However, it is possible that in the corresponding audio track there is not only English dialog, but a full sound track including the M&E. At the same time, there may be M&E in a separate track, if there is a 1 in the first bit position of the 100-bit field. How the various tracks are processed in order to derive a complete sound track for play in any given language depends on subsequent information. Field 6 simply represents which audio languages are available, as well as whether there is a separate M&E track (without any dialog).

There is another piece of information which is necessary in order for the audio scheme to function, and that information is represented in field 7. For each of the N available audio language tracks (up to a maximum of 16), there is a 3-bit code in the seventh field. Before describing the meaning of the codes, it must be understood how the codes are associated with particular tracks and languages. Suppose that field 6 is 101010000100 . . . 0 which is interpreted to mean that there is an M&E track, a French track, a Greek track and an English track. From this information alone, there is no way to tell whether there is even any M&E in the French, Greek and English tracks. All that is known language-wise is that dialog is available in only three languages. For this example, there would be 12 bits in field 7 The first three bits are associated with the M&E track, the second three bits are associated with the French track, and the third and fourth 3-bit codes are associated with the Greek and English tracks respectively. The 3-bit codes are as follows:

000—mixing master (M&E)
001—switching master (M&E)
010—dialog+(M&E), complete audio track
011—track to be mixed with mixing master
100—track to be switched with switching master These five codes are all that are necessary to form complete sound tracks in the three available languages, French, Greek and English. How the tracks are combined will be described below, but what should be borne in mind is that the purpose of the entire arrangement is to provide sound tracks in many languages (up to 15), without requiring what might be a 2-hour audio recording for each. In fact, if a movie is two hours long, but the actual dialog is only 30 minutes, the goal is to record one full track (M&E or original sound track), with only a 30-minute audio recording of dialog for a particular language.

Field 8 contains N×4 bits, that is, 4 bits for each of the N "1"s in field 6. There is thus a 4-bit code in field 8 for each audio language track which is available on the disk. The 4-bit code represents the track type, and there are a maximum of sixteen possibilities. Typical track types are single-channel mono, two-channel Dolby, 5.1-channel Musicam, etc. [The term 5.1-channel refers to left, right, center, left rear and right rear channels, together with a sub-woofer channel.] The 4-bit track type codes allow the master controller to determine the manner in which audio processor decoder 71 operates on the data in the up-to-16 audio tracks to derive analog outputs for speaker system 91.

Considering again field 7, there are several ways in which a complete sound track, in a selected language, can be derived from the disk. The operation of mixing involves mixing (adding together) two sound tracks. The operation of switching involves switching between two sound tracks, and playing only one of them at any given time. The first track is always M&E, if it is available. The code for this track is always 000 or 001. If the code is 000, it means that there is no dialog in the track and its M&E is to be mixed with the selected language track. If the code 011 is associated with the French track, for example, it means that the first and third tracks should be mixed at all times. The dialog, when there is dialog, appears in the French track, and mixing it with the mixing master provides a complete French sound track. On the other hand, the first track may be a switching master. What this means is that music and effects are recorded in this track, with or without dialog. The French track in this case would be represented by a 100 code It contains M&E and dialog, but only when there is dialog. The M&E track, the first, is played alone when there is no dialog, but the fifth track is played alone when there is. The tracks are switched, not mixed. The French track, when dialog is recorded in it, includes not only dialog but M&E as well since this would be the only source of M&E in a switched type operation.

The fifth possibility (010) is that a particular track happens to contain the original sound track, M&E together with dialog in the original language. If the dialog is in the selected language, the track can be played from beginning to end, by itself. This track can also serve as a switching master (code 001) for other languages.

When it comes to mixing tracks, whatever audios are in the two specified tracks (the mixing master and the track which is mixed with it) are simply added together at all times; whatever audio there is in the two tracks gets played. It is only when switching between the switching master and the track with which it is switched that one track gets played in lieu of the other. It is true that each track may contain audio information only when the other does not (which would allow mixing), but it is conceivable that the switching master will also include dialog, i.e., if it is a recording of the original sound track of the motion picture. That is why switching is employed—only one track is heard from at any given moment As will be described below, each data block includes bits which inform the master controller which audio tracks actually contain data in that block. If a selected audio language track with an original 100 track code has data in any data block, then the audio processor decoder 71 processes the data in that audio track to the exclusion of any data which might be in the switching master track.

Field 9 on FIG. 3 contains six bits which are coded to represent a number M. This is the number of "other" audio tracks, separate and apart from the up-to-16 audio language tracks. The usual use for these tracks is to represent, in compressed digital form, individual instruments or mixes of instruments, with the user having the option of combining them. In an extreme form, there could be 63 separate instrumental tracks, with the user being able to combine any tracks he desires, and to set their relative levels before mixing. If one of the tracks contains the combined sound to begin with, it is possible to delete an instrument from the orchestral mix by specifying that its information content should be deleted, or subtracted, from the orchestral mix. This would allow a user, for example, to play his piano to the accompaniment of an orchestra playing a concerto from which piano play has been eliminated. It would also allow a user to single out a particular instrument to facilitate practice. Precisely what the user does with the "other" audio tracks is determined by menu selections which are made available to him. Field 8 simply identifies how many "other" audio tracks are present on the disk. (The term "other" audio tracks would appear to be rather non-descriptive, but this isn't the case. The intent is that the term subsume any audio track usage other than the provision of sound tracks for motion pictures. Rather than to have orchestral music in these "other" audio tracks, for example, it is possible to have individual vocalists, allowing a user to study different harmonizations.)

It is apparent that if there are indeed 63 "other" audio tracks, then much if not most of the disk capacity may be allocated to audio data. But that is precisely why so many audio tracks are made available. It is certainly contemplated that some disks playable in the system of FIG. 2 will not include video. In fact, field 19, to be described below, is a 1-bit field which informs the master controller whether there is any video data at all on the disk.

Once it is determined that there are M "other" audio tracks, the next field specifies how each track is coded. As in the case of field 8, a 4-bit code is used for each of the "other" audio tracks. Thus the number of bits in field 10 can be as low as 0 (if there are no "other" audio tracks) or as high as 252 (63×4).

While the player can determine from reading fields 9 and 10 how many "other" audio tracks there are, the user has to be told what is in these tracks in order that he know what to do with them. There is a description of each track, and it is in multiple languages. The first thing that the player must be given is a list of the languages in which there are descriptions of the "other" audio tracks. A 100-bit field is used for this purpose. As indicated in FIG. 3, field 11 has 100 bits. A 1 in any bit position is an indication that track definitions are available in the respective language. The correspondence between bit positions and languages is the same in field 11 as it is in field 6. It will be recalled that the first bit position in field 6 corresponds to M&E, not a traditional "language". The first bit position in field 11 is thus not used, and there can be at most 99 "1"s in field 11.

Before the track definitions are actually read and processed, the player must determine what menu choices to provide the user. Suppose, for example, that there are ten "other" audio tracks, each having sounds of different orchestral instruments. Once the track definitions in the selected language are made available to the operating system, it can display a standard menu to the user. The user can then pick particular tracks to be played together, particular tracks to be deleted, their relative sound levels, and other "standard" choices. However, in case the "other" audio tracks do not represent orchestral music, or they do represent it but in a way that requires unusual menu selections, the standard operating system software for interfacing with the user so that the system can determine what is to be done with the "other" audio tracks will not suffice. To accommodate unusual situations, the operating system must be provided with special software for the creation of the menu, as well as to control how the selected tracks are mixed/deleted following user selections. The technique used is the same as the technique described above in connection with loading special software for changing the overall operation of the player (fields 3 and 4). Field 12 is a single bit. If it is a 1, it is an indication that there is a field 13 which contains special mixing/deletion software. As indicated on FIG. 3, field 13 thus has anywhere from no bits to an undetermined number which is dependent on the length of the special software to be loaded into the machine from the disk. The special software ends with a sync word so that the player will know when the next field begins.

The next field, field 14, consists of the track definitions themselves. Since there are M "other" audio tracks, and there are P languages in which they are to be defined for the user, P×M character strings are represented in field 14. Each string is separated from the next by an escape character. First there are M character strings (track definitions) in the first language corresponding to the first position in field 11 which contains a 1, then there are M character strings in the second language corresponding to the second bit position in field 11 which contains a 1, etc. As will be described below, the user informs the player in which of the available languages the menu which includes the track definitions should be displayed. While the entire DATA OUT bit stream from the disk drive is extended to the master controller in the system of FIG. 2, only the character strings corresponding to the selected language are processed. They are processed and displayed in accordance with the standard software, or the special mixing/deletion software which was just read from field 12 if such software is included on the disk. (It should be noted that it is the function of demultiplexer 63 to distribute to the several buffers only the respective data bits that are intended for them. It is controller 41 that tells the demultiplexer what to do after the controller interprets the information in both the lead-in track section and the individual data blocks.)

As described in connection with FIG. 2, provision is made for the insertion of subtitles. The language is selected by the user as will be described, but the player must be told the languages in which subtitles are available. Another 100-bit field is used for this purpose. As indicated in line 15 of FIG. 3, the "1"s in the field represent the individual languages available for subtitles. As is the case with the available display languages, there is a maximum of 99 since the first bit position corresponds to M&E which is not strictly speaking a "language."

Field 16 is a 4-bit multiple version code. The player is informed not only whether there are two versions of the same video presentation on the disk, but also what the choices are with respect to them. The first bit is a 0 if there is only one version on the disk, in which case the second and fourth bits are ignored. Bit 1 has a value of 1 if there are two versions on the disk. The second bit in the code tells the player whether the parental lock option is to be implemented, or whether a different criterion is to be used in selecting which version is played. The usual situation is where the parental lock option is implemented, in which case the bit in the second position of the 4-bit code is a 0. This informs the player that it should determine whether the parental lock option is "on." If it is, R-rated (or, more broadly, adult-rated) versions should not be played. The bit in position 3 of the code is an indication whether version A (the first or only version) is R-rated or not (0=no, 1=yes), and the fourth bit in the code provides the same information for version B if there are two versions; if there is only one version, the fourth bit is ignored. This is all the information the player needs to determine whether either or both of two versions can be played. When there are two versions of the same motion picture on the disk, the user is asked to select one of them. But if the parental lock option is "on" and one of the two versions is R-rated, the user is given only the choice of playing the non-adult version, or playing neither, as will be described below. If both versions are R-rated and the parental lock option is "on", then the user can watch neither version.

On the other hand, it is possible that there will be two versions of the same material on the disk, but it is not a question of one of them being adultrated and the other not. For example, one version might be a teaching film including questions and answers, and the other might involve a test on the same subject matter including just questions. For the most part the two versions would be the same. In such a case, the first bit in field 16 would still be a 1 to indicate that two versions are available, but the second bit would now be a 1 instead of a 0, to indicate that the choice between the two versions does not depend on whether they are R-rated or not. A 1 in the second bit position is an indication that the third and fourth bits characterize the two versions respectively with respect to a characteristic other than rating.

What the third and fourth bits actually mean in this case, and what menu choices are provided the user, has to be determined by resorting to different criteria. The same technique that was used twice previously is now used once again—special software is provided along with the version codes. Field 17 consists of a single bit which serves as a flag to indicate whether special version software is available. If the bit is a 1, then field 18 is read to access the software. As in the case of the two earlier software fields, field 18 terminates with a sync word to indicate the start of the next field. The special software controls a menu presentation that is unique for the particular disk.

The next field consists of a single bit As indicated in FIG. 3 it informs the player whether video data is available. If it isn't, it simply means that there are no video data block fields in the overall data blocks to be described in connection with FIG. 4.

Field 20 is a single bit, and it identifies the base or master aspect ratio. If the bit has a value of 0, it is an indication that any video on the disk has a 16:9 "wide screen" aspect ratio, as depicted in FIG. 9. On the other hand, if the bit is a 1, it is an indication that the aspect ratio of the video on the disk is 4:3

As described above, if the original video has a "wide screen" aspect ratio, then there are two ways in which a 4:3 reduced aspect ratio can be derived. One way is to form the video image from the middle part of the "wide screen" original. Another way is to "pan scan" in the sense that the section of the original image which is actually utilized is not necessarily always the middle part In fact, FIG. 9 shows the use of more information on the left than on the right of the original image. Field 21 is a single bit which is indicative of pan scan availability. If field 20 is a 1, the base aspect ratio is 4:3 so that pan scan availability is irrelevant—the single bit in field 21 is simply ignored. But if the base aspect ratio is 16:9 (field 20 has a 0), the value of the bit in field 21 tells the player whether the subsequent data blocks provide starting column information which can be loaded into pan scan buffer 57 on FIG. 2. If the bit in field 21 is a 0, the data blocks do not include column number information, and if the video is to be played in a 4:3 aspect ratio from a "wide screen" original, then the video image is formed from the middle part of each original frame. On the other hand, if pan scan information is available in the data blocks, then buffer 57 on FIG. 2 is updated as required and the final video formed will have an added degree of variability.

Field 22 is a 20-bit number which represents the total number of data blocks on the disk. However, if there are two different versions, while they have many data blocks in common, the remaining numbers of blocks in the two versions may be different. For example, a scene might be completely omitted from one of the versions, in which case it would have a smaller total number of data blocks. For this reason, if field 16 indicates that there are two versions of a motion picture or other source material on the disk, field 23 provides the total number of data blocks in version A, and field 24 provides the total number of data blocks in version B. Both fields are omitted if there is only one version on the disk.

Each data block may include video information for a variable number of frames. The system could determine the total playing time from the number of data blocks (either the total number if there is only a single version, or two different numbers if there are two versions), only if the system is informed of the original frame rate and the average number of frames represented in each block for the disk as a whole. Two disks with the same number of data blocks will have different running times if the original source material for one of them was motion picture film whose frames were generated at the rate of 24 per second and the other had an original source material derived from a 30 frame-per-second video camera. Field 25 is a 4-bit value that identifies the original frame rate (24, 30, etc.), a number necessary for proper generation of the video signal. Although the time represented by each data block could be determined from the frame rate if each data block contains only one frame, it is possible to store more or less than one frame of data in each data block. Also, there may be no frame information at all, i.e., the video availability flag in field 19 may be 0. Consequently, field 26 is provided. This field contains a 10-bit number which represents the block time factor, i.e., the average time duration represented by each block. Multiplication of the block time factor by the total number of blocks (or the total number in a particular version) yields the running time. (In practice, the block time factor is about the same for both versions on a disk. If desired, individual block time factors can be provided.)

As is common practice with optical disks in general, the disk of the invention may be provided with a table of contents for allowing the user to select a particular part to play, or simply to inform the user of precisely what is on the disk and how long each part takes to play. Field 27, if included, is a table of contents. If only one version of the source material is on the disk, then there is only one table of contents. Otherwise, there is an additional field 28 which consists of the table of contents for the second version. FIG. 3 sets forth the sub-fields in field 27.

For lack of a better term, the video presentation is divided up into what are called "chapters." For each chapter the table of contents includes an 8-bit chapter number, thus allowing a maximum of 255 individual chapters. Following each chapter number there is a 20-bit starting block serial block number. It will be recalled that all of the data blocks on the disk are numbered serially. In other words, while data blocks may be common to both versions A and B, or unique to only one of them, the numbers of the data blocks are in serial order along the disk track. The table of contents includes the serial block number of the data block which is the starting block for each chapter.

Similarly, in order to determine the play time for each chapter, the system must know how many blocks are included in each chapter. For this reason, the next piece of information is a 20-bit block duration. Multiplying this number by the block time factor allows the play time of each chapter to be determined. Alternatively, the actual running time for each chapter could be provided instead of the block duration. (Such information could be provided for different versions and standards.)

In order to display the title of each chapter, language strings must be provided. Once again, the system must be advised of the languages which are available for displaying chapter titles so that the user might select one of them. The usual technique of providing a 100-bit block for identifying available languages is employed.

Finally, the actual language strings for identifying individual chapters are provided. Each string ends with an escape character to separate it from the next string. This is the same technique used in connection with the "other" audio track definitions discussed above in connection with field 14.

Field 29 has a minimum of 100 bits and a maximum of 1200 bits. It will be recalled that there can be up to 12 authorized standards, i.e., the final video output can be in up to 12 different formats. In order to insure conformance with quality standards agreed upon by all manufacturers of players and all software publishers who have agreed to support a common set of specifications, it is possible to prevent unauthorized software publishers from publishing disks which will play on players of the invention. Moreover, it is possible to limit particular publishers to the manufacture of disks which will play according to only a sub-set of the 12 standards. For example, if royalties are to be paid on each disk which is manufactured according to the agreed-upon specifications, and the royalties vary in accordance with the number of standards according to which a disk can be played, it is possible to limit certain software manufacturers to only the sub-set of standards for which they have agreed to pay. For this reason, there is an encrypted authorization code for each standard; the codes are all stored in field 29. The disk will play according to a particular standard only if the proper encrypted authorization code is contained on the disk. Field 29 includes 100 bits for each of the standards authorized in field 5. Since at least one standard must be authorized there are at least 100 bits. The maximum number of bits is 1200 if all 12 standards are authorized.

The encryption scheme is based upon the principles of public-key cryptography. Public-key cryptography is by now well known, and a particularly clear exposition of the subject is to be found in the August 1979 issue of Scientific American, in an article by Hellman entitled "The Mathematics of Public-Key Cryptography." The use of a public-key cryptosystem allows a message to be encrypted at site A in accordance with a secret key, transmitted to site B, and decrypted at site B in accordance with a public key. The secret key for encrypting the message is known only to the transmitter. Such a scheme is typically used to authenticate a message. Upon decryption of the transmitted encrypted message at the receiving site, the message will be intelligible only if it was encrypted with the paired private key. And since the private key is private, if the decrypted message is intelligible, it must have originated with the owner of the private key.

Public-key cryptography is used in the invention in the following way. The actual data on the track is processed by the software publisher in accordance with a predetermined algorithm. The details of the processing are not important Any non-trivial processing that provides, for example, a 100-bit result based on the disk data will suffice. The 100-bit result is a "message" to be transmitted via the disk in anywhere from one to twelve encrypted forms. There are 12 cryptosystem key pairs, each associated with a different one of the standards. The private key for the first standard authorized on the disk is used to encrypt the 100-bit message and the 100-bit encryption is stored in field 29. This encryption is the authorization code for the particular standard. The same thing is done for all of the other standards authorized for the particular disk, with the private key associated with each of these standards being used in each case.

The player operating system computes the same 100-bit result or message that was originally computed by the software publisher. The player software then uses the public key associated with each of the standards authorized on the disk to decrypt the respective encrypted authorization code for that standard. The decrypted message should match the message computed by the operating system after processing the disk data. If they do not match, it is an indication that the software publisher did not have the private key for encrypting the authorization code for the particular standard, and the player will not produce a video signal according to that standard.

To explain this in another way, let it be assumed that the private key for authorized standard N on the disk gives rise to an encrypted message $Pri_N(X)$, where X is a message to be encrypted. Similarly, the function $Pub_N(X)$ represents the decryption of a function X using a paired public key. Let it further be assumed that the predetermined algorithm for processing the data on the disk is known by all player manufacturers and software publishers, and gives rise to a 100-bit result which is treated as a "message" M whose content (value) depends on the disk data. For standard N, the software publisher, after first deriving M, stores on the disk the 100-bit encrypted authorization code $Pri_N(M)$. The player first derives the value M in the same way that the software publisher did. The player software then uses the public key associated with standard N for decrypting the encrypted authorization code. The operating system thus derives $Pub_N(Pri_N(M))$. Since decryption of an encrypted message should result in the original message, the result of this decryption should be the same value M which the operating system derives by processing the disk data. If it is, then the particular standard is not only authorized, but the publisher has the right to authorize it. On the other hand, if the decryption of the encrypted authorization code M does not match the algorithmic result M derived by the player (because the software publisher did not have the private key with which to derive $Pri_N(M)$), then that particular standard is locked out.

While such a scheme works in the abstract, there is one practical problem which must be overcome. Suppose, for example, that the algorithm used to derive the original "message" M involves processing 20 data blocks on the disk with predetermined serial block numbers. (The processing might be something as simple as multiplying by each other successive groups of 100 bits each, and using as the result of each multiplication—for the next multiplication—only the 100 least significant bits.) A publisher who is not empowered to authorize standard N on a disk may nevertheless wish to do so. He does not know the private key with which to encrypt the derived value M which is applicable to his software. Consequently, he does not know what 100-bit encrypted code he should put on the disk which will decrypt in a player to the value M. But what he can do is copy the 20 predetermined data blocks from some other legitimate disk and put them on his own disk, and also copy the encrypted authorization code in field 29. Those 20 data blocks, when processed in a player, will result in the value M, and it will match the "stolen" encrypted authorization code after it is decrypted in the player. Of course, the software publisher may have committed copyright infringement, but that simply compounds the felony. The practical problem which the software publisher faces is that he will have data blocks which are "played" and which will be totally out of context insofar as his motion picture is concerned. However, because the way that multiple versions of a motion picture can be stored on the same disk in the first place is that the player can be controlled to skip over the play of certain data blocks, as will be described below, the software publisher can encode his other data blocks so that the copied data blocks are not played. In this way, the encryption protection can be rendered ineffective.

The solution is that while the algorithm that derives the "message" M in the first place may also operate on predetermined data blocks, it should operate on at least the lead-in section of the track. There is no way that an unauthorized publisher can copy the lead-in track fields from another disk because that would give a player incorrect information about the video and audio contents on the unauthorized publisher's disk. The lead-in data is a function of the particular subject matter of the disk, and it must appear in the track in order for the disk to play properly. Thus the information represented on FIG. 3 can be treated as the "message" M whose encryptions, one for each authorized standard, are derived using respective private keys and are stored in lead-in field 29. (Strictly speaking, the "message" M is the result of processing all fields except field 29. Also, the longer fields, such as those containing software, can be omitted from the processing.) The player derives the same "message", decrypts an encrypted authorization code with the public key associated with the respective standard, and then compares the two. If they don't match, the player determines that particular standard has not been authorized for the particular disk's publisher.

The encrypted authorization code field is shown toward the end of FIG. 3 and thus the corresponding processing is depicted toward the end of the flowchart of FIGS. 5A–5C to be discussed below. The positioning of the encrypted authorization code field as shown facilitates a description of its processing, but in fact the field may advantageously be placed at the start of the processing. It will be recalled that special software may be read from the disk to modify the normal player sequencing. It is therefore conceivable that a counterfeiter could write special software which causes the authorization code processing to be bypassed. By doing the processing before any special software is even read, the processing cannot be bypassed.

Returning to a description of the lead-in track fields, field 30 is a 1-bit data block command/data flag. This bit informs the operating system whether the data blocks include command information or data which is to be read during play of the disk. How the system determines whether a particular data block contains commands or data will be explained below. Field 30 simply indicates whether there is any such information at all. Finally, fields 31 and 32 are catch-all fields for allowing the disk to control unusual ways in which the player processes the information on the disk. It will be recalled that field 3 contains a flag which indicates whether field 4 contains special software which causes the player to operate in accordance with a program that is totally different from that usually employed, field 12 indicates whether field 13 contains special mixing/deletion software for use with the "other" audio tracks, and field 17 contains a flag which indicates whether field 18 contains special version software for processing the 4-bit multiple version code. Field 31 indicates whether there is "supplemental" software in field 32. The supplemental software is different from the special software of field 4 in that the software in field 4 is basically a substitute for the processing which is normally used, while the supplemental software generally works with that code, in conjunction with commands and data which are to be found in the data blocks.

Typically, the supplemental software would allow play of a video game, with related commands and data in the data blocks determining the course of play. But there are other uses of this technique. As another example of the way in which supplemental software, and commands and data in the data blocks, can be used, consider a disk designed to play a classic motion picture with subtitles, but which is also provided with a critical commentary which is to be displayed periodically in lieu of subtitles, perhaps during moments when the screen is caused to go blank except for the critical commentary. To show the flexibility which is possible, let us even consider a case where the critical commentary is to be in a different language. What is required in such a case is that the subtitle buffer 59 on FIG. 2 be loaded during the play of some data blocks with subtitles in one language and with subtitles in another language during play of other data blocks (some data blocks thus containing subtitles corresponding to the original motion picture, and others containing critical commentary in another language). In such a case, the system must somehow be told to switch back and forth between language subtitles, i.e., different subtitle tracks have to be processed in different data blocks. This can be conveniently controlled by issuing commands in the data blocks themselves. Similarly, if it is desired to blank the screen and interrupt the picture during display of commentary, a data block might include a data value which represents the duration of the blanking. Alternatively, if a commentary is to be made in a different language, it could be a different audio track which is selected for the purpose. In any case, the special software loaded from field 32 would control the processing of the commands and data contained in the data blocks, and would work in conjunction with the operating system of the player.

Processing of the Lead-In Track Fields

The flowchart of FIGS. 5A–5E depicts the processing of the information in the lead-in track fields. A description of this preliminary processing is presented at this point, with the functions of the individual fields in mind. The fields in the data blocks, as well as processing of the data blocks, are discussed below.

Figure 5A:
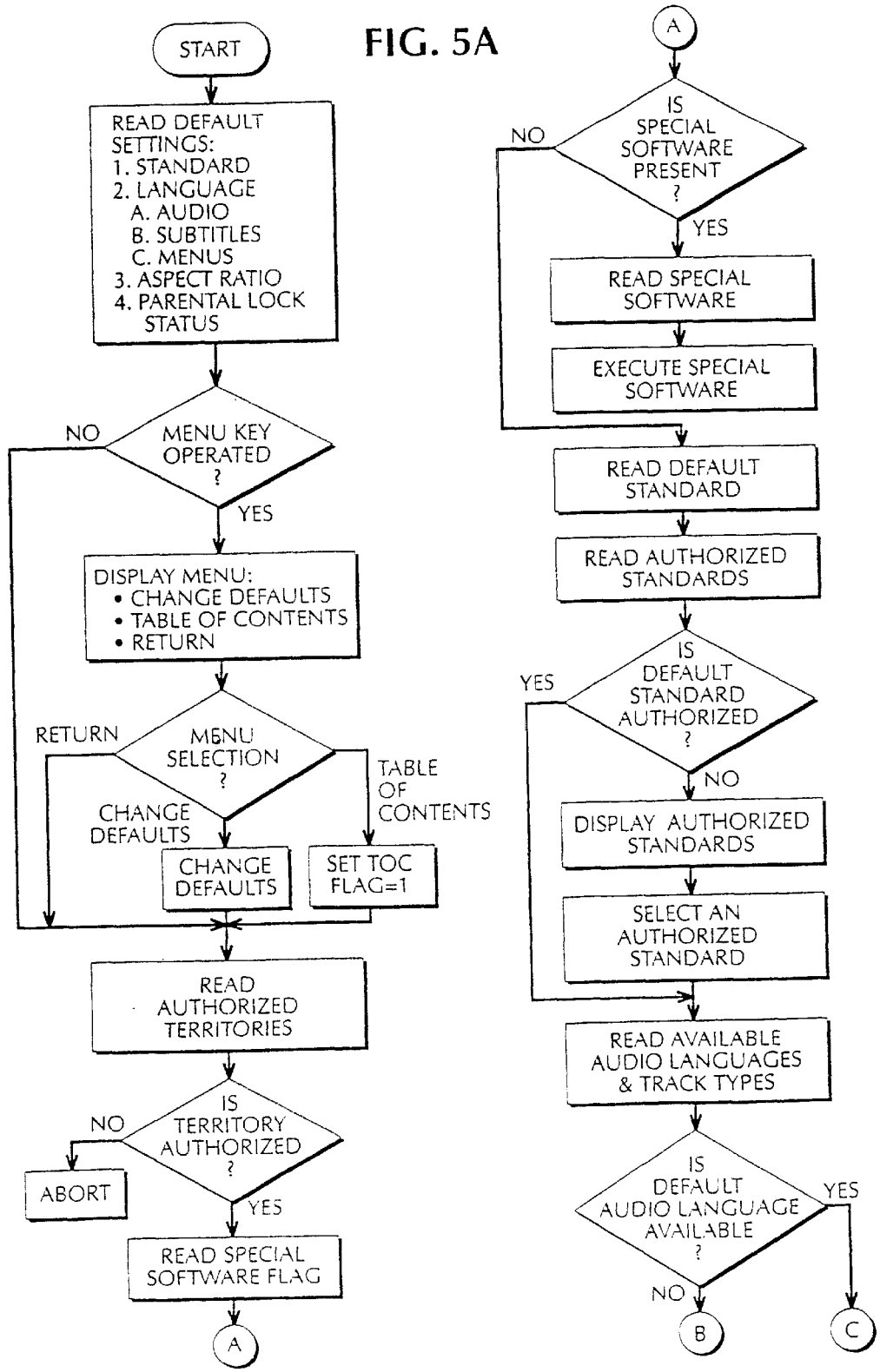
Figure 5B:
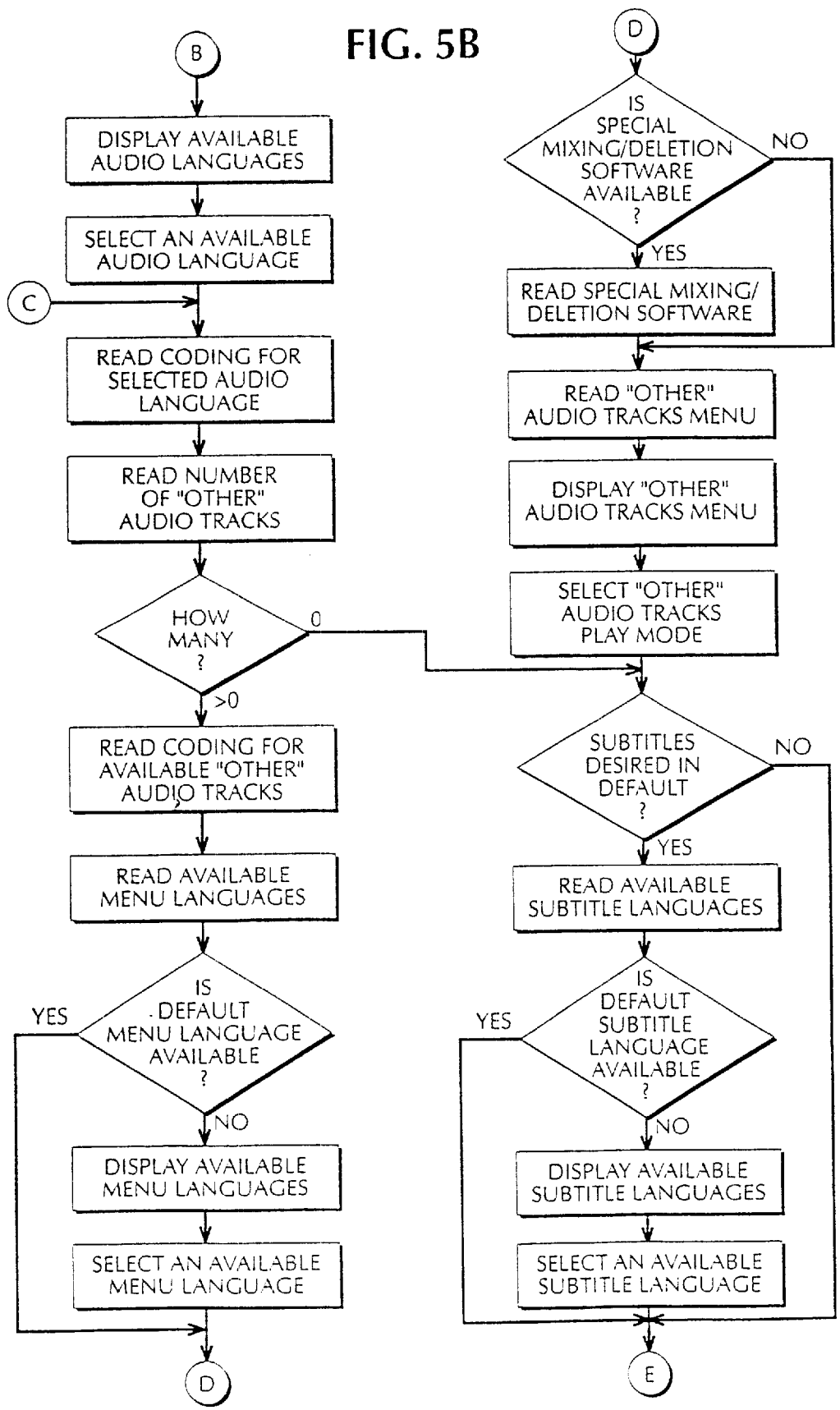
Figure 5C:
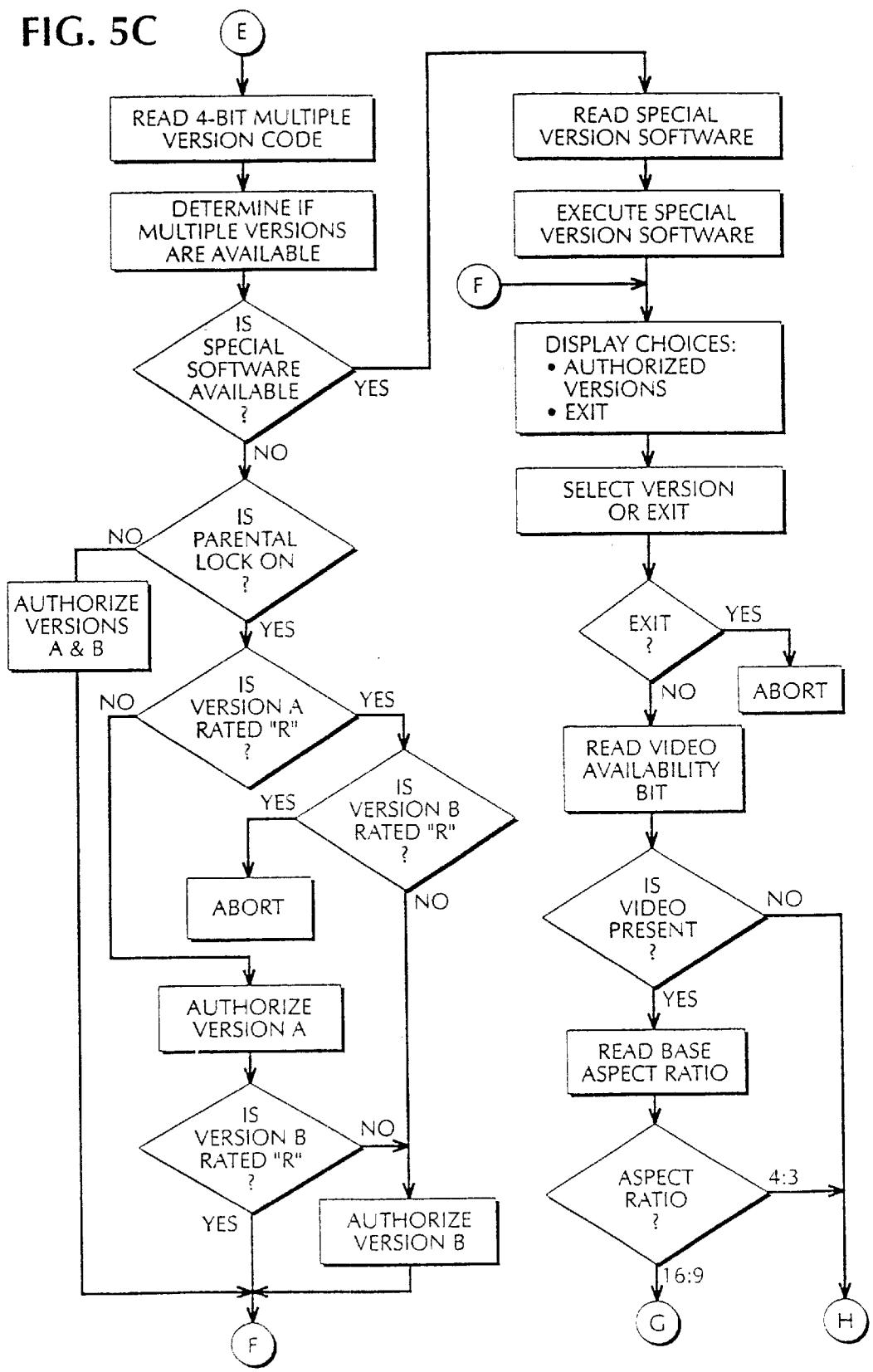
Figure 5D:
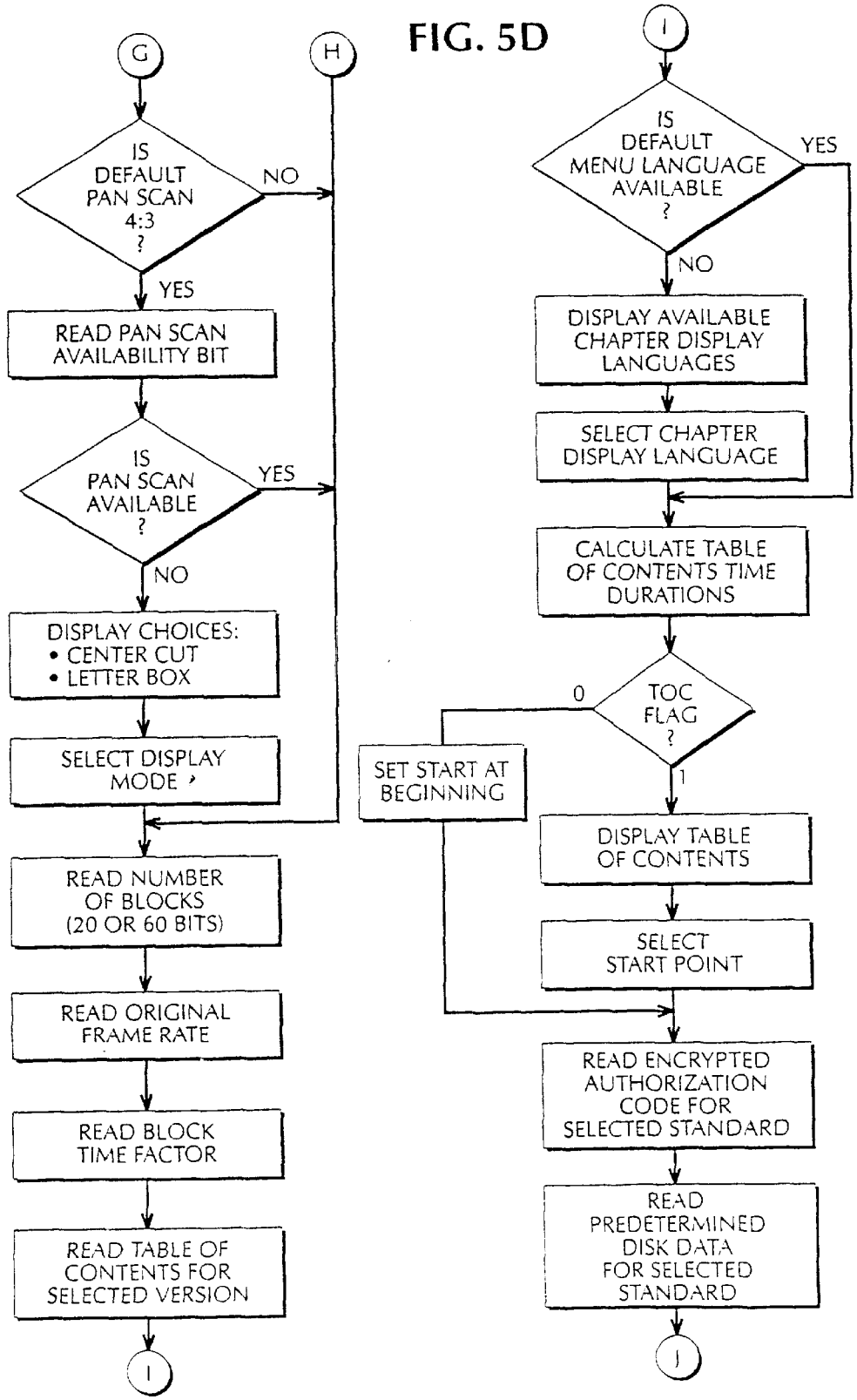
Figure 5E:
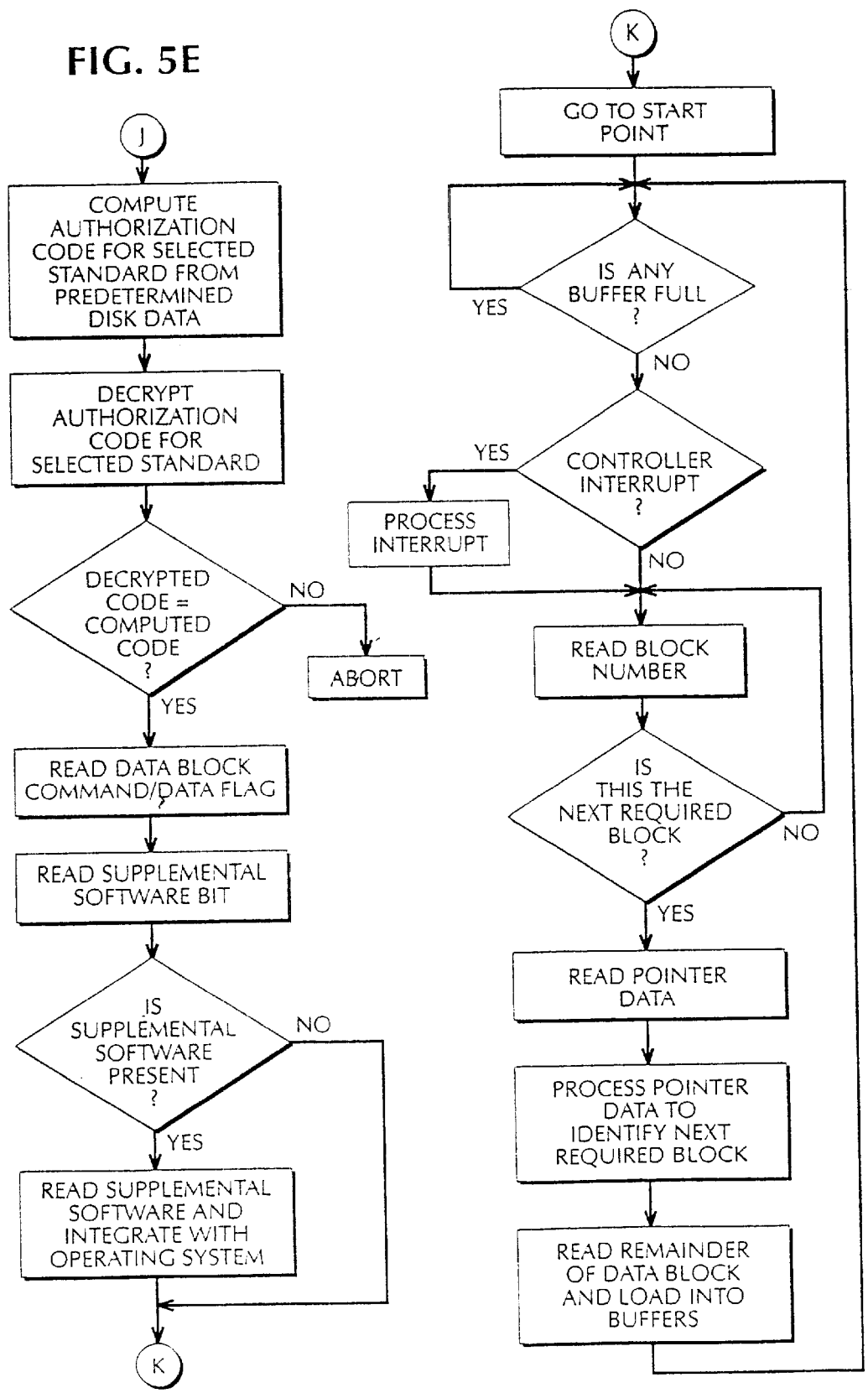

The system processing begins, as shown at the top of FIG. 5A, with the reading of default settings. These are settings established by DIP switches, ROM codes, or the use of any other device or technique which configures the system on power-up. It is typical in microprocessor-based systems to reset all flags and to read default settings when power is first turned on.

There are four default settings which are thus determined in order to configure the system. The first is the standard—players sold in the United States, for example, will typically be configured, in the default state, to produce an NTSC video signal.

The next default setting is language—the sound track dialog language, the subtitle language (if any), and the language in which menus are to be presented on the display. In the United States, for example, the default language would be English. If the user does not inform the player that a language other than English is desired for one or more of these functions, audio language track 10 will be used to generate the sound track, and character strings in the English language will be used in setting up the mixing/deletion menu for the "other" audio tracks and for the table of contents. As for subtitles, the usual default is "no language."

The third default is the aspect ratio, 4:3 in the United States. The aspect ratio determines the relative dimensions of the display represented by the final video output signal.

Finally, the parental lock status is determined. In the system of FIG. 2, this simply entails a determination of the setting of lock 81. But it is also possible to dispense with a physical lock and key, and to store the parental lock status in non-volatile memory after first inputting on the keyboard a password known only to the persons who exercise control over the lock function.

As in many consumer electronic devices, the keyboard can be used by the user at any time to interrogate or control the player. Routine control sequences which are standard in the art are not shown in the flowcharts. For example, the keyboard, or an associated remote control device, can be used to control the volume, fast forward, a jump to a specified chapter, etc. The normal processing can be interrupted to control a display by operating a menu key, as is known in the art At the start of the processing of FIG. 5A, there is shown a test for determining whether the menu key is operated. The reason for showing an interrogation of whether the menu key is operated at the start of the processing, as opposed to any other time during play of the disk, is that this is the mechanism by which default settings can be changed. If the menu key is operated when power is first turned on, the system displays a menu. As indicated in the flowchart, the user is given the choice of changing defaults, viewing the table of contents for the disk, and/or (in case the menu key was operated accidentally) simply returning to the processing without changing anything. As indicated, depending on the menu selection, the defaults are changed, the entire menu selection process is aborted, or a TOC (table of contents) flag is set to 1. This flag will be examined later to determine whether the table of contents should be displayed.

Thus far, no information from the disk has been processed. (In this description, references are sometimes made to reading a field and sometimes made to processing a field. It is to be understood that even when it is said that after a certain processing step a field is read, the field may actually have been read earlier but stored in a buffer for later use. Depending on the context, reading a field means to actually read it so that the bits appear on the DATA OUT conductor 25 in FIG. 2, or to do something with the data if it has been read earlier and buffered.) Referring to FIG. 3, the first information field which is read from the lead-in track section is a 40-bit field representing authorized territories. Next, a check is made to see whether the territory in which the player was intended for use is one of those authorized on the disk. The player territory is also a kind of default setting, but it is not grouped with the others because it cannot be changed by the user. (To allow a purchaser who moves from one territory to another to use his player, the player territory can be changed by an authorized technician.) If the player has been designed for use in China, for example, and China is not one of the territories authorized on the disk, play of the disk is aborted.

On the other hand, if the disk has been authorized for play in the player territory, field 3 is read. This single bit simply tells the system whether special software is present As shown in the flowchart, if it is present then the special software is read from field 4 and executed. The processing terminates with the "execute special software" step. This is intended to show that the special software in field 4 basically replaces the built-in operating system. Such software will be employed when a radical change in the overall use of the player is involved. (As mentioned above, this is not to say that the special software may not call BIOS routines and the like from the ROM chips containing the operating system.) If there is no special software present, the system reads the default standard, e.g., it determines that an NTSC standard is to be employed. If the user has changed the default standard through a menu selection, e.g., to PAL, then PAL is the new default standard. The system then accesses field 5 which authorizes up to 12 standards. The test which is performed is to determine whether the default standard (the original, or as changed at the start of the processing) is authorized. If it is not, a menu is displayed which shows the user the authorized standards, and he then selects one. After an appropriate selection is made, or if the default standard is authorized, the system processes fields 6 and 7. The reading of field 6 informs the player of the available audio languages (up to 16, including M&E and 15 languages).

Once again, a default value is tested against a set of allowed options. Earlier, it was the default standard that was tested against the authorized standards read from the disk. This time it is the default audio language (either the default language on power-up or a different language selected by the user if the menu key was operated) that is compared with all of those available. As shown in the flowchart, if the default language is not available, a display i; formed which lists the available audio languages, and the user selects one of them. The system then reads the track types in field 7. This is the field which informs the operating system whether there is an M&E track, whether it is to be used as a mixing or a switching master, and whether the selected language track is a complete audio track, is to be mixed with the mixing master, or to be switched with the switching master. Next, the track codings are read from field 8. Given the selected language, and its track type and track coding, as well as information about M&E, mixing and switching, the operating system has all of the information it needs to generate a sound track for the accompanying motion picture which meets the needs of the viewer.

The next thing that is done is to read field 9 to determine the number of "other" audio tracks which are on the disk, anywhere from none up to 63. If there are indeed no "other" audio tracks, all of the processing to determine what is to be done with them is bypassed. But if there are such tracks, field 10 is first read to determine how they are coded. Since the user has to be told what is in the tracks before he can determine what is to be done with them, the system must next determine from reading field 11 the "other" track menu languages which are on the disk. The usual type of check is then made to see whether the menu is available in the default language. If it is not, the available languages are displayed and the user selects one of them.

As described above, the operating system may execute a standard routine for reading the menu, displaying it, and interacting with the user as the user determines what should be done with the "other" audio tracks. But in the event special mixing or deletion is to be accomplished, special mixing/deletion software is required. Field 12 is read to see whether such software is available and, as indicated in the flowchart, any special mixing/deletion software which is on the disk is read from field 13. Only then are the actual menu items (in the selected language) read from field 14 and displayed for the user. Using the menus made available by the operating system, the user selects the play mode for the "other" audio tracks. He can, for example, mix them in any allowed way, use what is in a track for deletion (by phase inversion) from another more inclusive track, adjust one track for exclusive play, adjust relative audio levels, etc. The special mixing/deletion software, of course, can provide these options as well as others not routinely offered As shown in FIG. 5B, subtitle information is now processed according to the established pattern. First, the system determines whether subtitles are desired at all. At the very beginning of the processing in FIG. 5A, it will be recalled that one of the default settings is the subtitle language. The usual default setting will be that subtitles are not desired. If that is in fact the case, the subtitle processing is skipped entirely. But if subtitles are desired, the available subtitle languages are read from field 15. A test is then made to see if the default subtitle language is available. If it is not, the available subtitle languages are displayed and the user selects one of them.

Next, the 4-bit multiple version code in field 16 is read. The first bit indicates whether there are two versions available, or only one. A branch is not made at this point because first the system must determine whether special version software is available, and this is determined from field 17. If special version software is available, it is read from field 18 and executed. To the extent that this software must know whether multiple versions are available, and what the codes in the third and fourth bit positions represent, that has already been determined. Although indicated in the flowchart that the choices displayed for the user are to select among authorized versions, or to exit, it is to be understood that the display choices will generally be different if special version software is executed. Also, it should be understood that there may be special version software even if there is only one version that can be played. For example, it may be appropriate to warn a viewer that a particular program may be extraordinarily unsettling, and to ask for a "continue" response before play begins—all of this being separate and apart from an R-rating.

If special version software is not available, then bits 3 and 4 in the 4-bit multiple version code field are used for rating purposes. A test is performed to see whether the parental lock is on. If it is not, then there are no restrictions on the play of versions A and B, and both versions are authorized. If it was previously determined that there is only one version, then that version is considered to be version A and it is authorized.

On the other hand, if the parental lock is on, tests must be performed to see whether the versions on the disk are R-rated. As shown in FIG. 5C, if version A is R-rated, and so is version B, then play of the system is aborted; although not shown, an appropriate message may be displayed to advise the user why play has stopped. If version A is R-rated but version B is not, then only version B is authorized. On the other hand, if version A is not R-rated but version B is, only version A is authorized. Finally, even if the parental lock is on, if neither version is R-rated, then both versions are authorized.

The system next displays the choices available to the user. He can choose from among the authorized versions, or he can exit and stop playing the disk. (This latter case might arise, for example, if a child tries to watch an R-rated version, is told that it cannot be played, and a decision is made to go on to something else more interesting.)

If there is only one version available, if it is not R-rated, and if there is no special version software, then there may be no need for a display—there is only one motion picture which can be played, and there are no restrictions on who can watch it Nevertheless, as shown in the flowchart, the user is still given a choice between play of the disk and aborting play. The system could be designed to skip the display in such a case and simply to assume that the user wants to watch the only motion picture version which is on the disk. On the other hand, generating the display allows the user to verify that the disk he put in the player is indeed the disk he wants.

Although the invention has been described thus far in terms of one or two versions of a motion picture on a disk, it is to be understood that there can be three or more versions. This is one of the main reasons for providing the capability of reading special version software in the first place. This software can include all of the information required about the several versions from which menu displays are formed so that the user can select what is to be played. As mentioned above, the special version software can allow choices between teaching and test modes, and other options having nothing to do with whether particular motion pictures are adult-rated.

The system next reads the video availability bit in field 11, and thus determines whether the data blocks which will be processed subsequently contain video data. If video data is present, then the base or master aspect ratio in which it has been stored on the disk must be determined. The next step thus involves reading field 20 to ascertain whether the base or master aspect ratio is 16:9 or 4:3. If the master aspect ratio is 4:3, the next five steps are skipped because pan scan availability is irrelevant. If the default aspect ratio is 4:3, then there is a one-to-one correspondence between stored and displayed frames; if the default aspect ratio is 16:9, then a 4:3 frame is displayed on a wide screen with a dark band at either side. (Alternatively, the 4:3 image could be expanded to fill the 16:9 screen, with resulting loss of top and/or bottom information.) But if the base aspect ratio is 16:9, as shown on FIG. 9, there are several possibilities which must be explored.

One of the default values which is determined at the very start of the processing is the aspect ratio. The operating system checks whether the default aspect ratio is pan scan 4:3. Referring to FIG. 9, if the master aspect ratio is "wide screen" (the flowchart branch being processed), then the possibilities are letter box, pan scan centered on the wide screen image (not shown in FIG. 9), or pan scan variable (i.e., with a variable starting column number). If the default is not pan scan 4:3, then there are no choices to be made by the user now. The default is either wide screen or letter box, and subsequent processing is in accordance with the default which has already been determined.

On the other hand, if the default is pan scan 4:3, the issue is whether variable pan scan information is on the disk. The pan scan availability bit in field 21 is read. If pan scan is available, it means that the data blocks will specify to the operating system the starting column numbers for the pan scan—the user need select nothing at this point. On the other hand, if pan scan is not available, and this was the user's default, he must decide from among two possibilities—a center cut, in which the middle part of every wide screen frame is displayed, or a letter box form in which the entirety of every frame can be seen, but the display has dark bands at the top and bottom. A menu display is formed, and the user selects one of the two modes.

This use of a common aspect ratio on the disk which nevertheless allows the user to select from many different kinds of display exemplifies the design approach of the invention. The basic idea is to provide maximum flexibility while nevertheless storing all of the required data on an optical disk roughly the size of a conventional CD. Once a wide screen motion picture is stored on the disk, almost no additional real estate is required to allow the user to generate a video output having some other aspect ratio. Although there may be up to 15 languages in which dialog can be heard, there are nowhere near 15 full sound tracks because of the mixing and switching capabilities built into the player and the manner in which redundant information is eliminated from the audio language tracks. The same thing applies to video standards. While up to now high-quality video has required a medium which can be played only in NTSC, or PAL, etc., the present invention allows the same disk to give rise to video signals in up to 12 standards. One of the advantages of the invention is that it greatly reduces the number of different disks that must be produced, for example, by a motion picture company that distributes its movies throughout the world. While it is true that some fields may have to be changed from time to time, for example, different standards have to be authorized when videos are released in NTSC and in PAL at different times, such changes are relatively trivial and are easily made.

Once a decision on the display mode is made, field 22 is read to determine the total number of data blocks on the disk. If there are multiple versions, fields 23 and 24 are also read in order to determine the total number of data blocks in each of the versions. Field 25 is then read to determine the original frame rate, and field 26 is read to determine the block time factor.

Field 27 is then processed. It will be recalled from FIG. 3 that this is the field that contains all of the necessary information for display of the table of contents. The table of contents for the selected version (field 27 if there is only one version, or there are two and the first has been selected; or field 28 if there are two versions and the second has been selected) includes a 100-bit representation of the available chapter display languages. The default menu language is checked against those which are available. If the default menu language is not available, the user is informed of those languages in which chapter titles can be displayed, and he selects from among them. Once it has been determined in which language to display chapter information, the various table of contents time durations are calculated. Since it is known how many blocks are in each chapter, the duration of each chapter can be determined by multiplying the number of blocks by the block time factor.

The table of contents is not necessarily displayed. It is displayed only if the TOC flag was set at the start of the processing, the user having indicated that the table of contents should be displayed. If the TOC flag is 0, there is no need to display the table of contents. The system automatically selects the first data block as the starting point, that is, play of the disk starts at the beginning. On the other hand, if the TOC flag is a 1, the table of contents is displayed and the user is given the option of selecting the start point.

Following the table or tables of contents on the disk are the encrypted authorization codes for the standards authorized in field 5. The operating system reads the encrypted authorization code for the standard which has been selected. It then reads the predetermined data for the selected standard. It will be recalled that for each of the 12 possible standards, predetermined data on the disk is processed to derive a "message" M which serves as an authorization code. It is this authorization code that is stored in encrypted form on the disk using the private key associated with each standard. The data which is read from the disk may be different for each standard, as long as the same data is read and processed both during the encryption process and when the player derives the "message" M on its own. As discussed above, it is preferred that the data include at least part of the lead-in fields because it would be self-defeating for an authorized publisher to copy this data.

After the predetermined data for the selected standard is read, the authorization code ("message" M) is computed from the data. Using the public key associated with the selected standard, which key is built into the operating system, the stored authorization code on the disk for the selected standard is decrypted. The test for whether the software publisher has been authorized to publish disks which will play as video signals in the selected standard involves comparing the decrypted authorization code with the computed authorization code If they do not match, play is aborted.

If the two codes do match, field 30 is read. This single bit simply informs the master processor whether there are any commands or data stored in the data blocks other than the normal complement depicted in FIG. 4 to be discussed below. If the flag is a 0, the operating system does not even look for such additional commands or data in the data blocks. If the flag is a 1, it means that commands or data may be present in a data block, but not necessarily so.

Finally, field 31 is read in order to determine whether supplemental software is available. If it is, it is read from field 32. The supplemental software, as described above, is not to be used in lieu of the operating system software, but rather as a supplement to it This is the basic difference between the software in fields 4 and 32. Generally speaking, the supplemental software operates on commands and data included in the data blocks in a field whose presence is indicated (although not necessarily in every data block, as will become apparent below) by the supplemental software flag.

With the reading of field 32 and its integration with the operating system, the read head in the disk drive is caused to move to the start point. As described above, the start point is either the first data block or a data block determined by the user if a chapter other than the first has been selected. Data blocks are read in sequence and demultiplexer 63 on FIG. 2 distributes the data fields to various buffers. As indicated in the flowchart, the reading of a data block takes place only if no buffer is full. Furthermore, before a new data block is read, the system checks whether there are any interrupts which must be serviced. Controller 41 is the source of all interrupts. For example, if the user has operated the keyboard, the controller generates an interrupt on line 43 of FIG. 2 which temporarily halts the reading of data blocks. After the interrupt has been processed, or if there is no interrupt which must be serviced, the next data block is read. As will be described, the serial block number is one of the first things that is read. The block number/pointer analyzer 47 knows the number of the next block which is required. Very often, this will simply be the next block in the serial sequence. However, the block number may be out of sequence, for example, if a jump is to be made to a; new chapter, or, as will become apparent below, certain blocks have to be skipped on a disk when playing one of multiple versions of a motion picture. In any event, the systems checks whether the block being read is the correct one. If it is not, a branch is made back to the start of the block reading process so that a different block can be read. Also, gate 61 on FIG. 2 is closed so that the "wrong" data on conductor 25 is not extended to demultiplexer 63.

If the block read is the required block, one of the first things read immediately after the block number is pointer data. The pointer data is used by block number/pointer analyzer 47 to determine the block number of the next data block that is required, as indicated toward the end of the flowchart This block number is transmitted over cable 49 to microprocessor disk drive controller 27 in order that it access this data block at the completion of the reading of the current data block. As indicated at the end of the flowchart, the remainder of the data block which is being processed at the moment is read and loaded into the several buffers, following which another data block may be read.

The flowchart just reviewed controls the processing of the player. What is actually done with the data read from the data blocks is shown in the flowchart of FIG. 6, and this flowchart will be described after the fields in a data block, as listed in FIG. 4, are understood. But in order to appreciate the function of the pointer data which is included in a data block, FIGS. 7A and 7B will be described first. These figures depict how data blocks associated with individual or both versions of a motion picture interrelate with each other, and how the system is controlled to skip over certain data blocks in order to play a selected version.

FIGS. 7A And 7B—The Function of the Pointer Data

In the illustrative embodiment of the invention, there can be two versions of the same motion picture on a disk. Most of the data blocks will represent video and audio which are common to the two versions. However, there will be other blocks that are unique to one version or the other. The question is how to control the reading in succession of the data blocks that are required for a selected one of the two versions.

For purposes of description, the letters A, B and C will be used to identify respectively data blocks that are unique to version A of the motion picture, data blocks that are unique to version B, and data blocks that are common to both. FIG. 7B illustrates a portion of the track with successive data blocks being labelled A, B or C. It will be understood that in practice there may be thousands of data blocks in succession of the same type, with most of the data blocks on the disk being of type C. However, to illustrate the way in which the system jumps over data blocks that are not required, FIG. 7B shows at most two blocks of the same type in succession.

There are two sequences shown in FIG. 7B, one at the top for playing version B, and the other at the bottom for playing version A. If it is version B that is selected, and it is assumed that somehow the B block on the left is being played, it is apparent that the next two A blocks must be jumped over in order to go to the fourth block, a B block. After this block is played, the next A block must be jumped over. Two common C blocks are then played, after which a jump must be made over an A block to another C. The next block, a B, is then played, followed by B, C and B blocks. Finally, a jump is made over an A block to the last block shown in FIG. 7B, a C block.

If version A is being played, on the other hand, two successive A blocks are played, there is then a jump over a B block, the next five blocks—A, C, C, A, C—are played, there is next a jump over two B blocks to a C block, and finally there is a jump over another B block to an A and a following C.

The pattern which emerges is that there are three kinds of transitions from one block to another. First, there is the play of a block immediately following play of the preceding block. There are seven examples of this shown in FIG. 7B—AA, BB, CC, CA, CB, AC and BC. The two possibilities which are excluded are AB and BA, since blocks unique to the two versions will never be played during the same disk playing, much less one after the other. While there are seven kinds of transitions from block type to block type, there are really just three basic operations—going from one block of any type to the next block of any type; a jump from either an A to an A or C, or from a B to a B or C; or a branch from a C block either to an adjacent A or B, or to a B or A somewhere down the line. Most transitions are of the first type. The second type occurs when an A is followed by a B (which two blocks can never be played in succession); a jump must be made from the A to either another A or to a C. Similar remarks apply to a B followed by an A. The third type occurs at the end of the play of a C block, when there is no longer any common material to be played and a switch must be made to one version or the other; the next block is played if it is part of the version selected, or some blocks will have to be jumped over if the branch is to a block in the other version.

FIG. 7A shows the state diagram which defines how and when transitions are made from one block to another. As will be described below, every data block includes a two-bit pointer flag, possibly followed by a field which-contains a 20-bit pointer. (When a pointer is present, it always points to the serial block number of another data block.) Referring to the code given in FIG. 7A, if the two-bit pointer flag is 00, it is an indication that the processing should continue with the next block; in this case, there is no need for a pointer. If the two-bit pointer flag is a 01 code, it is an indication that a jump should be made to a block in the same version some distance away, or to a C block some distance away. In either case, a pointer is necessary.

The codes 10 and 11 are used when a branch is to be taken from a common C block. Which code is used depends on whether the next block is an A or B. If the block after the C is an A, code 10 is used and the pointer is to a B or a C further down the line. If the code is 11, it means that the next block is a B, and the pointer is to an A or a C further along the track. The operating system knows which version is being played. If version A is being played and the current block has a 10 pointer flag, it means that the next block, an A, should be played after the present one. There is no need for the pointer. The pointer is necessary in case version B is being played. In this case, since the next block is an A, it should not be played. The player should jump to the block identified by the pointer—either another C, or a B unique to version B being played.

Similarly, if version A is being played and the current block is a C with code 11 for its pointer flag, it means that the next block is a B. Since version A is being played, the next block should not be played after the current one. Instead, a jump is made to the A or C block identified by the pointer. On the other hand, if version B is being played, the system simply continues to the next block.

The legend on FIG. 7A shows whether or not the pointer is used when 10 and 11 pointer flags are found in a C block. The representation 10(P) is an indication that the pointer should be used, and a representation 10[P] is an indication that the pointer should be ignored. It will be recalled that the 10 code is used for a C block when the next block is an A If version A is being played, the pointer is not needed. That is why a transition from the C block to the succeeding block, an A, is shown by the symbol 10[P]. On the other hand, if version B is being played, since the next block is an A it cannot be played after the current C. Instead, there must be a jump to the block identified by the pointer and thus use of the representation 10(P)—the pointer points to either a B block or another C.

Similar remarks apply to the representations 11(P) and 11[P].

In both cases, it is a C block which is being played and the next block is a B. If version A is being played, the next block should not be played and thus the symbol 11(P) is required to show a state transition. On the other hand, if version B is being played, it is the succeeding B block which should be played, and thus the symbol 11[P] is appropriate.

The four codes, as well as the usages (P) and [P], are depicted in FIG. 7B. Referring to the PLAY B transition sequence, the first transition shown is 01(P). It will be recalled that the 01 code represents a jump from one version to a block of the same version or to a common block, and a pointer is required. The first transition shown is 01(P), a jump from a B block to another B block. The next transition on the PLAY B line is 01(P), a jump from a B to a C. Next is an example of the most common transition of all, 00, the orderly play of the next block after the current block.

The fourth transition in the PLAY B line is represented by a 10(P) symbol. The 10 code represents a branch from a C block when the next block an A, the example illustrated in FIG. 7B. In such a case, as indicated in FIG. 7A, if it is version B which is being played a jump is made to the block identified by the pointer—in this case, the next C.

The 11 code is used to identify a branch from a C block when the next block is a B. If version B is being played, the case under consideration, the pointer is not necessary because the next block is to be played. That is why the next code shown is 11[P]. There follow two 00 codes that represent obvious transitions to adjacent blocks, followed by a 11[P] code, a branch from a C block to the succeeding block which is a B. Finally, a jump is made from this B block over the next A block to a C block. This requires a 01(P) code—the code used to jump from a block of either version to a block of the same version or a common block.

The PLAY A sequence in FIG. 7B assumes that it is version A that is being played. The first four codes represent transitions to adjacent blocks, or a jump from a block of one version to a block in the same version. The next code, 10[P], is used to show a branch from a C block to an adjacent A block. The pointer is not used since version A is being played, and code 10 is employed because the next block is an A block. The next 00 code symbolizes the transition from the A block to a succeeding C block.

Next is a jump from a C block to another C block, skipping over two B blocks. The 11 code is used because this is the code employed when a B block follows a C block. The symbol used is 11(P), not 11[P], because the pointer is required in going from one C block to a C block further down the line. Similarly, the next code is again a 11(P) code to symbolize a branch from a C block to an A block further down the line. The sequence in FIG. 7B ends with a transition from an A block to the next block which is a C, for which the code 00 is used.

The state diagram of FIG. 7A summarizes all possibilities. Consider first the state in which an A block is being processed, represented by the circle with an A in it at the upper left. The two-bit pointer flag in an A block is 00 if the next block is also an A (shown by the transition from A back to A). If the next block is a B, on the other hand, then it clearly should not be played. There must be a jump from the A block over the B, either to another A or to a C. In either case, the code is 01(P). The drawing shows both a jump over B (to another A), and a jump over B to a C. The only other transition from an A block is to the next block if it is a C. This is shown by the code 00.

There are four similar transitions shown for state B, i.e., when a data block in version B is being read. The 00 code is used if the next block is a B or a C. The 01(P) code is used when the next block is an A, and it is jumped over so that the system can next read another B or a C.

Transitions from a C block are more complicated because there are seven of them, rather than only four as for each of the A and B blocks. If the next block is also a C, the code is a simple 00—read the next block. If the next block is a B and a jump must be made to another C, the code 10(P) controls the jump over the A. Similarly, the code 11(P) controls a jump over a B to another C. It will be recalled that these two codes are used to control branches from a C block, depending on whether the next block is an A or B. In either case, if the next block is not to be read, it (and blocks like it) must be jumped over to the next C.

However, after reading a C block, it is also possible to read an A or a B. To read an A, one of the codes 11(P) or 10[P] is used. The 11 code is employed when the next block is a B, in which case the pointer is required. The code is used when the next block is an A, in which case the pointer is not used. Similarly, to read a B block next, either the code 10(P) or 11[P] is used. The former is employed when the next block on the disk is an A, and the pointer is required because this block must be jumped over. On the other hand, if the next block is a B, the code 11 tells the system to go on to this next block, and in the process to ignore the pointer because it is not needed.

Perhaps the most important point to recognize is one which is not apparent from the drawings, and that is that most blocks will contain 00 pointer flags and no pointers. (The 00 code is the only one without a following pointer field.) That is because once a frame of either version is being played, or once a frame of the common material is being played, it is most likely that the next frame will be of the same type. Consequently, a 00 code alone does the job. The net result is that two versions of the same motion picture can be stored on the disk, with the user having the option of playing either (provided that it is allowed by the parental lock), and only a tiny fraction of the total disk real estate is "wasted" by housekeeping bits that control transitions from one block to the next block which is to be read after it. Again, this is in line with the underlying design philosophy of providing maximum flexibility and as many options as possible, without unduly wasting bits in the process.

It should also be noted that the invention is not limited to placing just two versions of a motion picture on a disk. It is possible to use the same technique with three or more versions (although the need for so many versions is less likely). In such a case, common blocks would require two pointers, not just one. If there are three versions on the disk, following a C block, the next block might be an A, B or D. Two pointers would be required to point to the two blocks which are to be found further down the line. Obviously, this is just one of the changes which would have to be made. The point is that multiple versions can be accommodated, albeit with an expenditure of more housekeeping bits. Nevertheless, the total number of pointer bits of this type is still inconsequential compared with the total number of audio/video bits.

Data Block Fields

FIG. 4 depicts the fields of a data block, and the format is similar to that shown for the fields of the lead-in track in FIG. 3. Every data block begins with a syno word. As discussed above, the sync word pattern cannot appear in the data, and thus when it is detected the operating system knows that a new data block is about to begin.

The second field is a 20-bit serial block number. All of the blocks on the disk are numbered in serial order. The block number is the first thing read because it is used by block number/pointer analyzer 47 in FIG. 2. The block number is essential, for example, when jumping from one block to another. The read head will usually be positioned at a point near the desired block, but it is highly unlikely that the correct block will be selected on the first try. This is especially true since the number of bits in the data blocks is variable, and the system has no way of knowing bow many bits there are in the blocks being skipped. By reading the block number at the start of the data block, the system can quickly determine whether the head must be repositioned.

The third field is a two-bit code which represents whether the block is part of the A version, the B version, or common to both. (Only three of the four possible codes are used.) It might be wondered why the system would ever have to check on the version of a particular block, since once play of version A or version B begins, the pointers discussed in connection with FIGS. 7A and 7B will always identify a block which is either common or part of the version being played. The answer has to do with fast forward and fast reverse operations. Although these have not been discussed at length because they are entirely conventional techniques, when fast forwarding, for example, the read head may be positioned more or less arbitrarily. The video should not be shown if it is of the wrong version. It is not possible to determine the version of a block simply by looking at the block number or the pointer. Neither identify the version. It is for this reason that the system must be able to determine the version of the block when it is first read.

Fields 4 and 5 contain the two-bit pointer flag and 20-bit pointer which have been explained at length in connection with FIGS. 7A and 7B.

Field 6 is a one-bit flag which may or may not be present. Referring to FIG. 3, the video availability flag in field 19 tells the operating system whether there is any video in the data blocks. Even if there is, however, it does not mean that every data block contains video. For a system in which there is a single frame represented in every data block, and data blocks are processed at a fixed rate, there would be video in every data block, even if it is "minimal" video which consists of a code representing a "no change." But there may be systems in which a data block may represent more or less than a single frame. For example, it may be that the video information in a data block, if present at all, is always of the same number of bits. Depending upon the compression, it may be that many frames are represented in a single data block. In such a case, some of the blocks would be devoid of video bits. Depending upon the coding scheme employed, the bit in field 6 informs the operating system whether there is a field 7 at all. If there is video, field 7 contains the video information, terminating with a sync word. As mentioned above, the actual coding of the video and audio blocks does not comprise part of the subject invention. Although MPEG schemes are preferred, others can be used.

Field 8 contains anywhere from no bits up to 16. It will be recalled that field 6 of the lead-in track contains 100 bit positions, but only N of these (where the maximum N is 16) can represent bits of value 1 because there can be at most 16 audio tracks on the disk (of which M&E is considered to be one of them). For each of these N tracks, field 8 informs the operating system whether there is any audio in the present data block. There are thus X "1"s, up to a maximum of N. The first bit position of N-bit field 8 corresponds with the first audio language track identified in field 6 of the lead-in track. The second bit in field 8 of a data block is associated with the second audio language represented in field 6 of the lead-in track, etc. The reason that there are only N (maximum=16) bits in field 8 of FIG. 4, rather than 100, is that it is known from the lead-in track which are the languages that may be present in a data block. There is no reason to provide 84 or more bit positions in each data block to indicate that the corresponding languages are not present when it is known from the lead-in track that they are nowhere to be found on the disk. It must be borne in mind that the value X in FIG. 4 does not equal the value N in FIG. 3. The latter represents the total number of audio languages anywhere on the disk, and its maximum value is 16. The symbol X represents how many of those N are actually represented in the current data block.

Field 9 contains the X audio language blocks. Suppose that there are 10 audio languages represented on the disk, but only six of them are represented in the current data block. In this case, there would be X bit sequences corresponding to the audio languages, each ending with an escape character. The escape character is used to separate audio blocks from each other. If whenever an audio block is present it has a fixed duration, then, since it is known how many audio blocks are present in a data block from the information in field 8, it is not necessary to provide a sync word at the end of the field. Variable length audio blocks would require a sync word at the end of the field.

Field 9 in the lead-in track contains a value from 0 to 63 which represents the number of "other" audio tracks. While there may be M such "other" audio tracks, as shown in FIG. 3, it does not mean that each of them is represented in the current data block. Field 10 in each data block contains M bits, one for each of the "other" audio tracks on the disk. Whether the current data block actually contains bit information for any of these M tracks depends on whether the corresponding bit position in field 10 contains a 1. If there are Y "1"s and Y is less than M, it means that not all of the "other" audio tracks are represented in the current data block. Field 11 contains Y "other" audio track blocks, each ending with an escape character. It will be appreciated that the way the audio tracks and the "other" audio tracks are represented in the data block are comparable.

Referring back to FIG. 2, it will be recalled that data bits in a data block are distributed to audio buffers, a video buffer, a pan scan buffer and a subtitle buffer, as well as to master controller 41 over the COMMAND/DATA line 65. Thus far, the representation of audio blocks, "other" audio blocks and a video block have been considered in the analysis of the fields of FIG. 4. Before proceeding with the representation of the subtitle data, however, it must be understood that there is a difference in the way that subtitle information is represented, as opposed to all audio and video data. The latter is represented on a block-by-block basis, and the buffers are continuously replenished with new audio and video data. Subtitles, on the other hand, need not change from frame to frame. In fact, a subtitle will not even be perceived if it does not remain on the screen for more than one frame. Consequently, once subtitle data is represented in buffer 59 if FIG. 2, it causes a subtitle to be formed on the display and to remain there until new subtitle information is loaded into the buffer. To remove a subtitle without introducing a new one, a new subtitle consisting of a blank field is loaded into the buffer.

Field 12 in the data block consists of P bits, each corresponding with a different one of the P subtitle languages identified in field 15 of the lead-in track. (It will be recalled that the -first position in every 100-bit field corresponding to languages does not really represent a language, but rather M&E, so that there are a maximum of 99 subtitle languages.) Any subtitle for which there is an update in the current data block has a 1 in its corresponding position in field 12. There can he up to Z "1"s, where the maximum value of Z is P.

For each subtitle language for which there is an update in the current data block, the update appears in field 13. There are Z update blocks, each ending with an escape character. It is important to understand that an update block can be a blank field. This is the way in which a subtitle is removed when a new subtitle is not yet to take its place.

Field 14 consists of one bit which may or may not be present. The field is present only if field 21 in the lead-in track is a 1. In such a case, pan scan information is available in the data blocks. If pan scan information is available, each data block must tell the operating system whether it actually contains a new starting column for the pan scan. Field 14 is a single bit, a flag, which indicates whether there is a pan scan update. If the bit is a 1, field 15 is a 9-bit column number, i.e., a pan scan update.

Finally, field 16 is a single bit which may or may not be present, depending on the value of field 30 in the lead-in track. This one-bit flag in the lead-in track tells the operating system whether supplemental commands and data may be present in field 17 of a data block. If the command/data present flag is a 1, the command/data block is read from field 17. The field ends with an escape character.

A data block field thus contains up to six different types of data—audio, "other" audio, video, pan scan information, subtitles and a command/data block. These are the six types of information which were discussed above in connection with FIG. 2, with demultiplexer 63 distributing the different blocks of information to the audio buffers, video buffer, pan scan buffer, subtitle buffer and master controller.

Processing of the Data Block Fields

The processing of the data in a data block is relatively straight-forward. The processing shown in the flowchart of FIG. 6 dovetails with the data block fields themselves shown in FIG. 4.

It has already been described how block number/pointer analyzer 47 on FIG. 2 processes the serial block number, version, two-bit pointer flag and pointer contained in fields 2–5 of a data block. The next field is the video present flag. As shown on FIG. 6, if it is determined that video data is present, video buffer 55 on FIG. 2 is loaded with the video in field 7. If video data is not present, the buffer simply has a marker loaded into it.

It is important to understand the need for markers. In order for the operating system always to be able to synchronize video, audio, subtitle, etc. information, it must be able to tell where in the several different buffers is the information from the same data block. In other words, the operating system must know which part of the audio data in an audio buffer goes with which part of video data in the video buffer. Otherwise the various information items cannot be synchronized with each other. By providing markers in the buffers for data which is not present in the data blocks, the operating system can keep the various items of information synchronized with each other.

Next, the operating system looks at field 8 to determine how many of the N audio tracks on the disk (see FIG. 3) actually are represented in the current data block. The same is true of the M "other" audio tracks represented in field 10. All of the audio and "other" audio track data are loaded into their respective buffers. The flowchart shows the sequencing only for the first and last of the audio tracks. In each case, a test is performed to see whether the audio track or "other" audio track has data present in the current data block. Each of the tracks results in something being loaded in its respective buffer—either actual data followed by a masker, or a marker alone.

After the video and audio information, a data block contains subtitle updates. If there is update information for the subtitles in the selected language, it is loaded in the subtitle buffer; otherwise a marker alone is stored. The three blocks pertaining to subtitles pertain only to a single track, that corresponding to the selected subtitle language.

Next, the pan scan update flag in field 14 is read. If pan scan update information is present, it also gets loaded, this time in a pan scan buffer. If no new information is available, a marker is simply placed in the pan scan buffer to indicate that another data block has gone by with no new pan scan update information.

Finally, the system determines whether there are commands or data available (if the lead-in track field 30 says that commands or data are to be found at all in the data blocks). If command/data is present, i.e., field 16 in the data block is a 1, it is loaded from field 17 into memory in the master controller 41 of FIG. 2. If there are no commands or data available only a marker is loaded in the microprocessor memory.

It should be noted that none of the processing sequences of FIG. 6 shows a check being made whether the respective type of information is available on the disk in the first place. But it is to be understood that a test such as "is command/data present?" really consists of two parts. First, is the data block command/data flag in field 30 of the lead-in track a 0 or 1? If it is a 0, commands and data are not even looked for during the processing of a data block. On the other hand, if command or data may be present in a data block as a result of the data flag in field 30 of the lead-in track being a 1, then each data block has its field 16 checked to see whether the command/data present flag is a 1. It is the value of the flag in the data block field which determines whether only a marker gets loaded, or a marker following data bits. Similar remarks apply to the other sequences. For example, there is no reason to check whether a pan scan update is present if from the lead-in track it is determined that pan scan information is nowhere present on the disk.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A data stream, to be processed by a compatible system that operates on bits at a constant bit rate, for representing a plurality of different-type signals synchronized with each other, said different-type signals being represented in the data stream in the form of digital data, characterized in that each of said different-type signals is represented by a bit stream designed to be processed at a bit-use rate which varies with the information content of the signal itself and with the bit-use rates for said plurality of different-type signals being independent of each other, the digital data being organized in a series of data blocks among which are data blocks containing different numbers of bits in respective ones of multiple bit streams, the bit streams being distributed among the data blocks such that bits of each bit stream, after being operated upon and buffered by a compatible system, are at all times available for use as required for proper reconstruction of the respective represented signal.

2. A data stream in accordance with claim 1, wherein some data blocks have no bits of one or more of said bit streams.

3. A data stream in accordance with claim 1 or claim 2 wherein each of said data blocks contains codes indicative of which bit streams have bits contained in such data block.

4. A data stream in accordance with claim 1 or claim 2, wherein each of said data blocks contains characters identifying the boundaries of the different bit streams contained therein.

5. A data stream in accordance with claim 1 or claim 2, wherein codes in the data stream identify the individual bit streams contained in said series of data blocks.

6. A set of data embodied on a machine-readable medium or in a data stream for representing a plurality of different-type signals synchronized with each other, each of said different-type signals being represented by a bit sequence designed to be processed by a compatible system at a bit-use rate which varies with the information content of the signal itself and with the bit-use rates for said plurality of different-type signals being independent of each other, the data being organized in a series of data blocks among which are data blocks containing different numbers of bits in respective ones of multiple bit sequences, the bit sequences being distributed among the data blocks such that bits of each bit sequence, after being operated upon and buffered by a compatible system, are at all times available for use as required for proper reconstruction of the respective represented signal.

7. A set of data embodied on a machine-readable medium or in a data stream in accordance with claim 6, wherein some data blocks have no bits of one or more of said bit sequences.

8. A set of data embodied on a machine-readable medium or in a data stream in accordance with claim 6 or claim 7, wherein each of said data blocks contains codes indicative of which bit sequences have bits contained in such data block.

9. A set of data embodied on a machine-readable medium or in a data stream in accordance with claim 6 or claim 7, wherein each of said data blocks contains characters identifying the boundaries of the different bit sequences contained therein.

10. A set of data embodied on a machine-readable medium or in a data stream in accordance with claim 6 or claim 7, wherein codes in the set of data identify the individual bit sequences contained in said series of data blocks.

* * * * *